United States Patent
Venkataraman et al.

(10) Patent No.: US 11,119,788 B2
(45) Date of Patent: Sep. 14, 2021

(54) SERIALIZATION FLOORS AND DEADLINE DRIVEN CONTROL FOR PERFORMANCE OPTIMIZATION OF ASYMMETRIC MULTIPROCESSOR SYSTEMS

(71) Applicant: Apple Inc., Cupertino, CA (US)

(72) Inventors: Aditya Venkataraman, Sunnyvale, CA (US); Bryan R. Hinch, Campbell, CA (US); John G. Dorsey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 16/376,785

(22) Filed: Apr. 5, 2019

(65) Prior Publication Data

US 2020/0073671 A1 Mar. 5, 2020

Related U.S. Application Data

(60) Provisional application No. 62/726,783, filed on Sep. 4, 2018.

(51) Int. Cl.
*G06F 1/00* (2006.01)
*G06F 9/38* (2018.01)
(Continued)

(52) U.S. Cl.
CPC .......... *G06F 9/3877* (2013.01); *G06F 1/3228* (2013.01); *G06F 1/3296* (2013.01);
(Continued)

(58) Field of Classification Search
None
See application file for complete search history.

(56) References Cited

U.S. PATENT DOCUMENTS

2005/0034002 A1 2/2005 Flautner
2009/0007108 A1 1/2009 Hanebutte
(Continued)

OTHER PUBLICATIONS

Krishna, C. Mani, and Kang G. Shin, "Performance Measures for Multiprocessor Controllers," 1982, pp. 1-26.
(Continued)

*Primary Examiner* — Nitin C Patel
(74) *Attorney, Agent, or Firm* — Blank Rome LLP

(57) ABSTRACT

Closed loop performance controllers of asymmetric multi-processor systems may be configured and operated to improve performance and power efficiency of such systems by adjusting control effort parameters that determine the dynamic voltage and frequency state of the processors and coprocessors of the system in response to the workload. One example of such an arrangement includes applying hysteresis to the control effort parameter and/or seeding the control effort parameter so that the processor or coprocessor receives a returning workload in a higher performance state. Another example of such an arrangement includes deadline driven control, in which the control effort parameter for one or more processing agents may be increased in response to deadlines not being met for a workload and/or decreased in response to deadlines being met too far in advance. The performance increase/decrease may be determined by comparison of various performance metrics for each of the processing agents.

12 Claims, 20 Drawing Sheets

(51) Int. Cl.
  *G06F 1/3228* (2019.01)
  *G06F 1/3296* (2019.01)
  *G06F 9/48* (2006.01)
  *G06F 9/50* (2006.01)
(52) U.S. Cl.
  CPC .......... *G06F 9/4843* (2013.01); *G06F 9/4887* (2013.01); *G06F 9/5094* (2013.01)

(56) References Cited

U.S. PATENT DOCUMENTS

| | | |
|---|---|---|
| 2009/0328055 A1 | 12/2009 | Bose |
| 2014/0277815 A1* | 9/2014 | Hanumaiah ............. G06F 1/206 700/299 |
| 2015/0121105 A1* | 4/2015 | Ahn ...................... G06F 1/3293 713/322 |
| 2015/0347178 A1* | 12/2015 | Magee ................... G06F 9/545 718/103 |
| 2015/0355700 A1* | 12/2015 | Pusukuri ............... G06F 9/5011 713/323 |
| 2016/0239074 A1* | 8/2016 | Lee ........................ G06F 1/3225 |
| 2016/0246647 A1* | 8/2016 | Harris ................... G06F 9/5027 |
| 2017/0153962 A1 | 6/2017 | Biegun |

OTHER PUBLICATIONS

Lopez-Lapena, Oscar, Maria Teresa Penella, and Manel Gasulla, "A Closed-Loop Maximum Power Point Tracker for Subwatt Photovoltaic Panels," IEEE Transactions on Industrial Electronics 59.3 (2011): pp. 1588-1596.

Noltsis, Michail, et al., "A Closed-Loop Controller to Ensure Performance and Temperature Constraints for Dynamic Applications," ACM Transactions on Embedded Computing Systems (TECS) 18.5 (2019): pp. 1-24.

Park, Soyeon, et al. "Managing Energy-Performance Tradeoffs for Multithreaded Applications on Multiprocessor Architectures," Proceedings of the 2007 ACM Sigmetrics International Conference on Measurement and Modeling of Computer Systems, 2007, pp. 169-180.

Qahouq, Jaber A. Abu, and VaraPrasad Arikatla, "Online Closed-Loop Autotuning Digital Controller for Switching Power Converters," IEEE Transactions on Industrial Electronics 60.5 (2012): pp. 1747-1758.

Shin, Kang G., and C. Mani Krishna, "New Performance Measures for Design and Evaluation of Real-Time Multiprocessors," 1983, pp. 1-50.

* cited by examiner

SERIALIZATION FLOORS AND DEADLINE DRIVEN CONTROL FOR PERFORMANCE OPTIMIZATION OF ASYMMETRIC MULTIPROCESSOR SYSTEMS

BACKGROUND

A multi-core processor may be implemented as a single computing component having two or more independent processing units called "cores." Cores are units that read and execute program instructions. The single computing component can run multiple instructions on separate cores at the same time, increasing overall speed for tasks amenable to concurrent computing. The multiple cores may be incorporated onto a single integrated circuit or may be multiple integrated circuits integrated into a single package. Multi-core processors may be considered as belonging to two different categories, symmetric multicore processors (SMP) and asymmetric multicore processors (AMP). An SMP includes two or more processor cores controlled in a way that treats all processors more or less equally, reserving none for special purposes. SMPs may have a plurality of cores of a same core type. Conversely, AMPs may have a plurality of cores of different types, architectures, microarchitectures, etc. Each core of an AMP may or may not run an operating system and/or may be controlled more independently than in the case of an SMP.

In some embodiments, an AMP can have a first set of "efficiency cores" that may be more efficient than a second set of "performance cores." In some cases, the efficiency cores may be designed to minimize energy consumed per instruction processed. Performance cores may be designed to maximize a number of instructions processed per unit of time. In some embodiments, other types of processors may be provided, such as graphics processing units (GPUs), which may include multiple GPU cores or execution units, neural engines optimized for accelerating neural network operations, and other types of processors or coprocessors such as an image signal processor, a scaling and rotating engine, etc. An exemplary embodiment of an AMP embodying multiple cores of multiple types is the A11 Bionic chip designed by Apple Inc. of Cupertino, Calif., which includes a six-core CPU featuring two performance cores and four efficiency cores, a three core GPU, and a neural engine.

A potential advantage of AMPs is that different components or processing cores can more quickly and/or more efficiently perform certain operations. In some embodiments, one processor core (e.g., a CPU core) may package instructions and data associated with a particular thread or thread group for another processing component (e.g., a GPU). During the time that the GPU (for example) is working on the thread or thread group, the CPU (for example) may be freed up to perform other tasks (improving processing throughput) or may be transitioned to a lower power state (improving power efficiency). It is known in the art to obtain efficiency by reducing the voltage/frequency supplied to a processor core, or even to set a core to an idle or "dark" mode in which the core is shut down and not processing instructions. However, in some cases a substantial amount of time may be required to bring a core back to a higher performance processing state, which can negatively affect performance. Thus, it may be desirable to provide alternative power management techniques for asymmetric multi-core processors that can account for the relative workloads and timings of the different processing components.

SUMMARY

A method of controlling performance of one or more processors or coprocessors of an asymmetric multiprocessor system can include executing a thread group on a processor and a coprocessor of the asymmetric multiprocessor system, wherein the thread group has a first control effort parameter corresponding to the processor and a second control effort parameter corresponding to the coprocessor. The method can further include and at least one of performing a hysteretic adjustment of the first control effort parameter to transition the processor to a low power state while a workload associated with the thread group is executing on the coprocessor or performing a hysteretic adjustment of the second control effort parameter to transition the coprocessor to a low power state while a workload associated with the thread group is executing on the processor. The hysteretic adjustment can include delaying a time between a workload being submitted to the coprocessor and decreasing the first control effort parameter. The hysteretic adjustment can alternatively or additionally include decreasing a rate at which the first control effort parameter decreases. The processor and/or coprocessor may be a central processing unit, a graphics processing unit, a general purpose graphics processing unit, a neural engine, an image signal processor, a scaling and rotating engine, etc. The control effort parameter can affect at least one of an allocated subset of cores or execution units and a dynamic voltage and frequency state of the processor.

A method of controlling performance of one or more processors or coprocessors of an asymmetric multiprocessor system can also include executing a thread group on a processor and a coprocessor of the asymmetric multiprocessor system, wherein the thread group has a first control effort parameter corresponding to the processor and a second control effort parameter corresponding to the coprocessor, storing a value of the first control effort parameter when a workload is submitted to the coprocessor, and resetting the first control effort parameter to a value derived from the stored value of the first control effort parameter when a result of the workload is delivered to the processor. Resetting the first control effort parameter to a value derived from the stored value of the first control effort parameter can include resetting the first control effort parameter to the stored value of the first control effort parameter. Resetting the first control effort parameter to a value derived from the stored value of the first control effort parameter can also include resetting the first control effort parameter to the stored value of the first control effort parameter times a factor derived from the degree of serialization of the workload. Resetting the first control effort parameter to a value derived from the stored value of the first control effort parameter can also include resetting the first control effort parameter to the stored value of the first control effort parameter times a factor derived from a length of time required to execute the workload. Resetting the first control effort parameter to a value derived from the stored value of the first control effort parameter can also include resetting the first control effort parameter to the stored value of the first control effort parameter times a tuning factor. The tuning factor may be derived from a performance priority of the workload, and/or a desired level of power consumption for the workload. The processor and/or coprocessor may be a central processing unit, a graphics processing unit, a general purpose graphics processing unit, a neural engine, an image signal processor, a scaling and rotating engine, etc. The control effort parameter affects at least one of an allocated subset of cores or execution units and a dynamic voltage and frequency state of the processor.

An asymmetric multiprocessor system can include a processor complex comprising one or more processors, one or more coprocessors, a closed loop performance controller configured to control performance of the one or more processors and the one or more coprocessors, and an operating system executing on the processor complex. The operating system can include an input/output service interactive with the closed loop performance controller and one or more drivers corresponding to the one or more coprocessors. The performance controller may be configured to cooperate with the operating system, the processor complex, and the one or more coprocessors to execute a thread group on a processor and a coprocessor of the asymmetric multiprocessor system, wherein the thread group has a first control effort parameter corresponding to the processor and a second control effort parameter corresponding to the coprocessor and at least one of perform a hysteretic adjustment of the first control effort parameter to transition the processor to a low power state while a workload associated with the thread group is executing on the coprocessor, or perform a hysteretic adjustment of the second control effort parameter to transition the coprocessor to a low power state while a workload associated with the thread group is executing on the processor. The hysteretic adjustment can include introducing a delay between the time that a workload is submitted to the coprocessor and the time at which the first control effort parameter is decreased. The hysteretic adjustment can also include decreasing a rate at which the first control effort parameter decreases. The processor and/or coprocessor may be a central processing unit, a graphics processing unit, a general purpose graphics processing unit, a neural engine, an image signal processor, and a scaling and rotating engine. The control effort parameter may affect at least one of an allocated subset of cores or execution units and a dynamic voltage and frequency state of the processor.

An asymmetric multiprocessor system can include a processor complex comprising one or more processors, one or more coprocessors, a closed loop performance controller configured to control performance of the one or more processors and the one or more coprocessors, and an operating system executing on the processor complex. The operating system can include an input/output service interactive with the closed loop performance controller and one or more drivers corresponding to the one or more coprocessors. The closed loop performance controller may be configured to cooperate with the operating system, the processor complex, and the one or more coprocessors to execute a thread group on a processor and a coprocessor of the asymmetric multiprocessor system, wherein the thread group has a first control effort parameter corresponding to the processor and a second control effort parameter corresponding to the coprocessor, store a value of the first control effort parameter when a workload is submitted to the coprocessor, and reset the first control effort parameter to a value derived from the stored value of the first control effort parameter when a result of the workload is delivered to the processor.

The closed loop performance controller may reset the first control effort parameter to a value derived from the stored value of the first control effort parameter by resetting the first control effort parameter to the stored value of the first control effort parameter. The closed loop performance controller may also reset the first control effort parameter to a value derived from the stored value of the first control effort parameter by resetting the first control effort parameter to the stored value of the first control effort parameter times a factor derived from the degree of serialization of the workload. The closed loop performance controller may also reset the first control effort parameter to a value derived from the stored value of the first control effort parameter by resetting the first control effort parameter to the stored value of the first control effort parameter times a factor derived from a length of time required to execute the workload. The closed loop performance controller may also reset the first control effort parameter to a value derived from the stored value of the first control effort parameter by resetting the first control effort parameter to the stored value of the first control effort parameter times a tuning factor. The tuning factor may be derived from a performance priority of the workload and/or a desired level of power consumption for the workload. The processor and/or coprocessor may be a central processing unit, a graphics processing unit, a general purpose graphics processing unit, a neural engine, an image signal processor, and a scaling and rotating engine. The control effort parameter may affect at least one of an allocated subset of cores or execution units and a dynamic voltage and frequency state of the processor.

A method of controlling performance of a plurality of processing agents in an asymmetric multiprocessor system can include executing a thread group on at least first and second processing agents of the asymmetric multiprocessor system, the thread group having a completion deadline, determining whether the thread group was completed before the completion deadline, and responsive to a determination that the thread group was not completed before the deadline, increasing the performance of at least one processing agent based on a comparison of performance metrics for the at least first and second processing agents. The comparison of performance metrics for the at least first and second processing agents can include a comparison of execution time for the at least first and second processing agents. The comparison of performance metrics for the at least first and second processing agents can also include a comparison of critical execution time for the at least first and second processing agents. The comparison of performance metrics for the at least first and second processing agents can also include a comparison of power efficiency for the at least first and second processing agents. Power efficiency may be determined by analyzing past power consumption of the at least first and second processing agents.

Increasing the performance of at least one processing agent based on a comparison of performance metrics for the at least first and second processing agents can include increasing the performance of each of the at least first and second processing agents. Increasing the performance of each of the at least first and second processing agents can include increasing the performance of each of the at least first and second processing agents in proportion to their contribution to a total of the compared performance metrics. Increasing the performance of at least one processing agent can include increasing the performance of at least one processing agent in discrete steps along a ladder of fixed performance states.

A method of controlling performance of a plurality of processing agents in an asymmetric multiprocessor system can further include determining whether the thread group was completed too soon before the completion deadline and, responsive to a determination that the thread group was completed too soon before the deadline, decreasing performance of at least one processing agent based on a comparison of performance metrics for the at least first and second processing agents. The comparison of performance metrics for the at least first and second processing agents can include a comparison of execution time for the at least first and second processing agents. The comparison of performance metrics for the at least first and second processing agents can also include a comparison of critical execution time for the at least first and second processing agents. The comparison of performance metrics for the at least first and second processing agents can also include a comparison of power efficiency for the at least first and second processing agents. Power efficiency can be determined by analyzing past power consumption of the at least first and second processing agents. Decreasing the performance of at least one processing agent based on a comparison of performance metrics for the at least first and second processing agents can include decreasing the performance of each of the at least first and second processing agents. Decreasing the performance of each of the at least first and second processing agents can also include decreasing the performance of each of the at least first and second processing agents in proportion to their contribution to a total of the compared performance metrics. Decreasing the performance of at least one processing agent can also include decreasing the performance of at least one processing agent in discrete steps along a ladder of fixed performance states.

An asymmetric multiprocessor system can include a processor complex comprising a plurality of processing agents, a closed loop performance controller configured to control performance of the plurality of processing agents, and an operating system executing on the processor complex, the operating system comprising an input/output service interactive with the closed loop performance controller. The closed loop performance controller may be configured to cooperate with the operating system and the plurality of processing agents to execute a thread group having a completion deadline, determine whether the thread group was completed before the completion deadline; and responsive to a determination that the thread group was not completed before the deadline, increasing the performance of at least one processing agent based on a comparison of performance metrics for the plurality of processing agents. The comparison of performance metrics for the plurality of processing agents can include a comparison of execution time for the plurality of processing agents, a comparison of critical execution time for the plurality of processing agents, and/or a comparison of power efficiency for the plurality of processing agents. Power efficiency may be determined by analyzing past power consumption of the plurality of processing agents.

The closed loop performance controller can increase the performance of at least one processing agent based on a comparison of performance metrics for the plurality of processing agents by increasing the performance of each of the plurality of processing agents. The closed loop performance controller can increase the performance of each of the plurality of processing agents by increasing the performance of each of the plurality of processing agents in proportion to their contribution to a total of the compared performance metrics. The closed loop performance controller can increase the performance of at least one processing agent by increasing the performance of at least one processing agent in discrete steps along a ladder of fixed performance states.

The closed loop performance controller may be further configured to cooperate with the operating system and the plurality of processing agents to determine whether the thread group was completed too soon before the completion deadline and, responsive to a determination that the thread group was completed too soon before the deadline, decrease performance of at least one processing agent based on a comparison of performance metrics for the plurality of processing agents. The comparison of performance metrics for the plurality of processing agents can include a comparison of execution time for the plurality of processing agents, a comparison of critical execution time for the plurality of processing agents, and/or a comparison of power efficiency for the plurality of processing agents. Power efficiency may be determined by analyzing past power consumption of the plurality of processing agents.

The closed loop performance controller may decrease the performance of at least one processing agent based on a comparison of performance metrics for the plurality of processing agents by decreasing the performance of each of the plurality of processing agents. The closed loop performance controller may decrease the performance of each of the plurality of processing agents by decreasing the performance of each of the plurality of processing agents in proportion to their contribution to a total of the compared performance metrics. The closed loop performance controller may decrease the performance of at least one processing agent by decreasing the performance of at least one processing agent in discrete steps along a ladder of fixed performance states.

DETAILED DESCRIPTION

In the following detailed description, reference is made to the accompanying drawings in which like references indicate similar elements, and manners in which specific embodiments may be practiced are shown by way of illustration. These embodiments are described in sufficient detail to enable those skilled in the art to practice the invention, and it is to be understood that other embodiments may be utilized, and that logical, mechanical, electrical, functional, and other changes may be made without departing from the scope of the present disclosure. The following detailed description is, therefore, not to be taken in a limiting sense, and the scope of the present invention is defined only by the appended claims.

Reference in the specification to "one embodiment" or "an embodiment" or "some embodiments" means that a particular feature, structure, or characteristic described in conjunction with the embodiment can be included in at least one embodiment. Unless otherwise noted or required by context, characteristics of one embodiment are not mutually exclusive with other embodiments. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order that illustrated.

Figure 1:
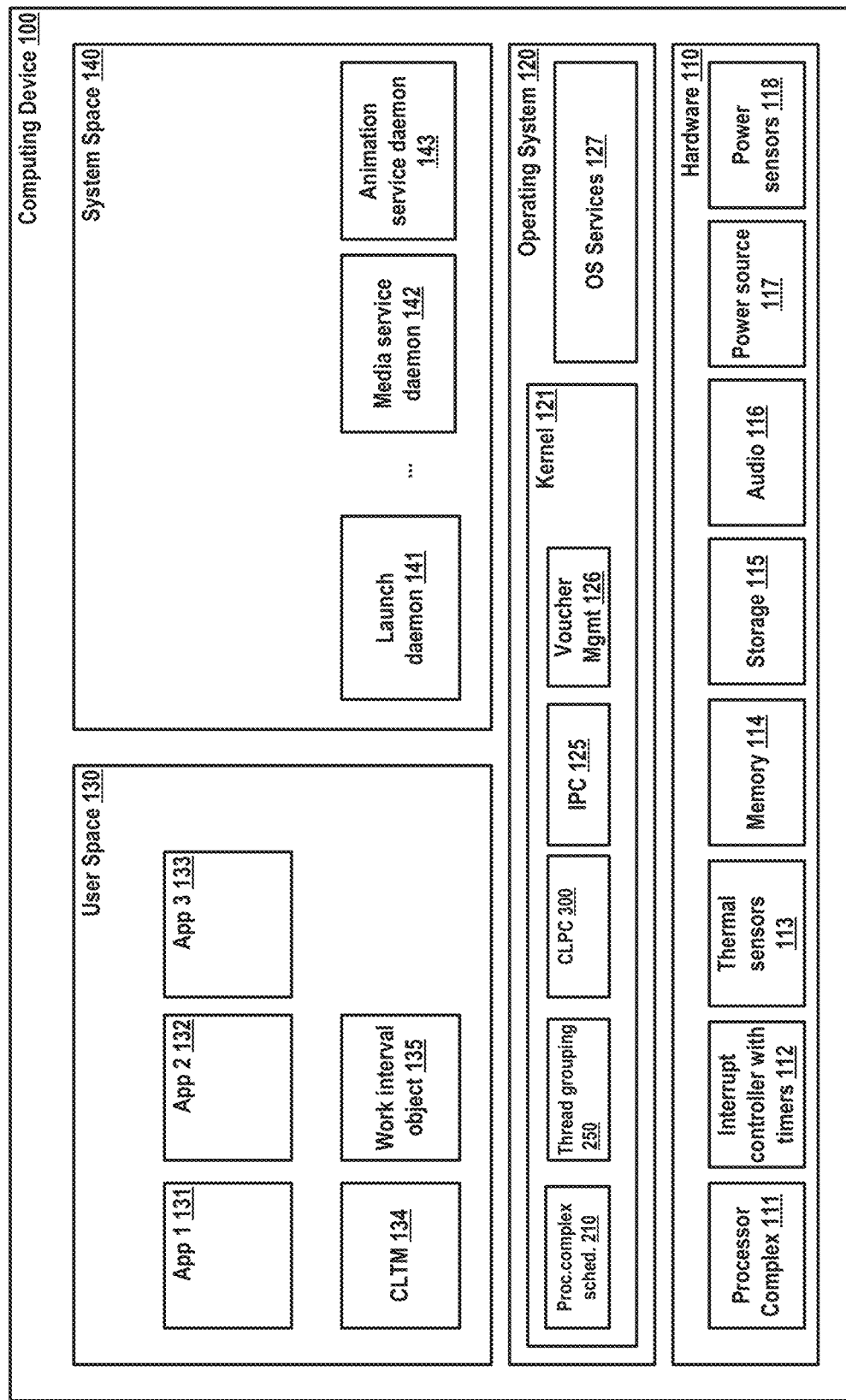
FIG. 1 illustrates a block diagram of a processing system having a plurality of core types each having one or more cores.

FIG. 1 illustrates, in block form, an overview of a system 100 for processing threads belonging to thread groups on a processor comprising a plurality of core types each having one or more cores. The system 100 can include hardware 110, operating system 120, user space 130, and system space 140 as described more fully below.

Hardware 110 can include a processor complex 111 with a plurality of core types or multiple processors of differing types. Processor complex 111 can comprise a multiprocessing system having a plurality of clusters of cores, each cluster having one or more cores of a core type, interconnected with one or more buses. Processor complex 111 can comprise an asymmetric multiprocessing (AMP) system having a plurality of clusters of cores wherein at least one cluster of cores has a different core type than at least one other cluster of cores. Each cluster can have one or more cores. Core types can include performance cores, efficiency cores, graphics cores, digital signal processing cores, arithmetic processing cores, neural processing cores, and other core types. A performance core can have an architecture that is designed for very high throughput and may include specialized processing such as pipelined architecture, floating point arithmetic functionality, graphics processing, or digital signal processing. A performance core may consume more energy per instruction than an efficiency core. An efficiency core may consume less energy per instruction than a performance core. In an embodiment, processor complex 111 can comprise a system on a chip (SoC) that may include one or more of the hardware elements in hardware 110.

Hardware 110 can further include an interrupt controller 112 having interrupt timers for each core type of processor complex 111.

Hardware 110 can also include one or more thermal sensors 113. Hardware 110 can additionally include memory 114, storage 115, audio processing 116, one or more power sources 117, and one or more energy and/or power consumption sensors 118. Memory 114 can be any type of memory including dynamic random-access memory (DRAM), static RAM, read-only memory (ROM), flash memory, or other memory device. Storage can include hard drive(s), solid state disk(s), flash memory, USB drive(s), network attached storage, cloud storage, or other storage medium. Audio 116 can include an audio processor that may include a digital signal processor, memory, one or more analog to digital converters (ADCs), digital to analog converters (DACs), digital sampling hardware and software, one or more coder-decoder (codec) modules, and other components. Hardware can also include video processing hardware and software (not shown), such as one or more video encoders, camera, display, and the like. Power source 117 can include one or more storage cells or batteries, an AC/DC power converter, or other power supply. Power source 117 may include one or more energy or power sensors 118. Power sensors 118 may also be included in specific locations, such as power consumed by the processor complex 111, power consumed by a particular subsystem, such as a display, storage device, network interfaces, and/or radio and cellular transceivers.

Operating system 120 can include a kernel 121 and other operating system services 127. Kernel 121 can include a processor complex scheduler 210 for the processor complex 111. Processor complex scheduler 210 can include interfaces to processor complex 111 and interrupt controller 112. Kernel 121, or processor complex scheduler 210, can include thread group logic 250 that enables the closed loop performance controller (CLPC) to measure, track, and control performance of threads by thread groups. CLPC 300 can include logic to receive sample metrics from processor complex scheduler 210, process the sample metrics per thread group, and determine a control effort needed to meet performance targets for the threads in the thread group. CLPC 300 can recommend a core type and an allocated subset of that core type. CLPC 300 may also provide information used to determine a dynamic voltage and frequency scaling (DVFS) state for processing threads of the thread group and is discussed in greater detail below. Inter-process communication (IPC) module 125 can facilitate communication between kernel 121, user space processes 130, and system space processes 140.

User space 130 can include one or more application programs 131-133, closed loop thermal management (CLTM) 134, and one or more work interval object(s) 135. CLTM 134 can monitor a plurality of power consumption and temperature metrics and feed samples of the metrics into a plurality of tunable controllers. A work interval object 135 is used to represent periodic work where each period has a deadline. The work interval object 135 possesses a token and a specified time interval for one instance of the work. Threads that perform work of a particular type, e.g., audio compositing, and the work must be completed in a specified interval of time, e.g., a frame rate of audio, can be associated with the work interval object 135. User space 130 can include a plurality of work interval objects 135. A work interval object 135 can have its own thread group, as may be specified in source code, compiled code, or a bundle of executables for execution. Threads that perform work on behalf of the work interval object 135 can opt-in to the thread group of the work interval object 135. For threads that have opted-in and adopted the thread group of the work interval object 135, work performed by the threads, on behalf of the work interval object 135, is associated with the thread group of the work interval object 135 for purposes of CLPC 300 operation.

System space 140 can include a launch daemon 141 and other daemons, e.g., media service daemon 142 and animation daemon 143.

CLPC 300 is a closed loop performance controller that determines, for each thread group, a control effort needed to ensure that threads of the thread group meet their performance goals. A performance goal can include ensuring a minimum scheduling latency, ensuring a block I/O completion rate, ensuring an instruction completion rate, maximizing processor complex utilization (minimizing core idles and restarts), and ensuring that threads associated with work interval objects complete their work in a predetermined period of time associated with the work interval object. Metrics can be periodically computed by CLPC 300 from inputs sampled by CLPC 300 either periodically or through asynchronous events from other parts of the system. In an embodiment, inputs can be sampled at an asynchronous event, such as the completion of a work interval object time period, or a storage event. A plurality of performance metrics can be computed within CLPC 300 and fed to one or more tunable controllers to output a control effort needed for the thread group to meet its performance goals.

In an embodiment, a control effort is a unitless value in the range 0 to 1 that can be used to determine a performance state associated with the thread group. Control effort may be used to determine a dynamic voltage and frequency scaling (DVFS) state and an allocated subset of available cores of various types for the various processing units of the processor complex.

Figure 2:
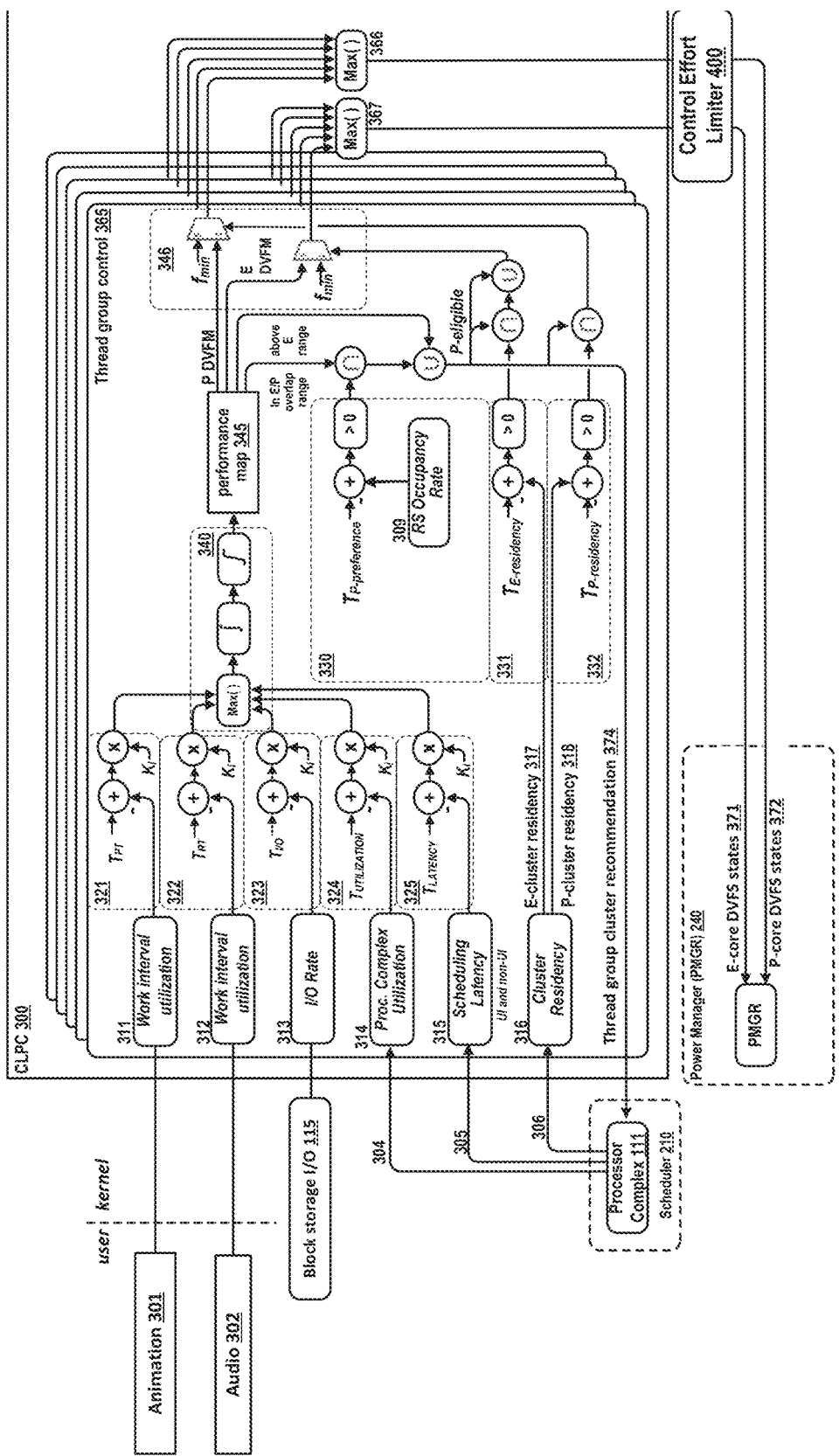
FIG. 2 illustrates a block diagram of a closed loop performance control (CLPC) system of a system for controlling performance of threads belonging to thread groups on a processor comprising a plurality of core types.

FIG. 2 illustrates, in block form, components of a closed loop performance control (CLPC) system 300 of a system for processing threads having thread groups on a processor comprising a plurality of core types each having one or more cores, according to some embodiments. For each of a plurality of thread groups 365 that have been active on a core, CLPC 300 can receive a sample of each of a plurality of performance metrics. An "input" into CLPC 300 denotes information obtained by CLPC 300 either by periodically sampling the state of the system or through asynchronous events from other parts of the system. A "metric" is computed within CLPC 300 using one or more inputs and could be fed as an input to its tunable controller and controlled using a tunable target. A metric is designed to capture a performance trait of a workload. A workload is a set of computing operations (e.g., work items) to be performed by a processor or co-processor. Input sources can include, e.g., animation work interval object (WIO) 301, audio WIO 302, block storage I/O 115, and processor complex 111. Example metrics from the input sources can include work interval utilization 311 and 312, I/O transaction rate 313, processor complex utilization 314, thread scheduling latency 315, and cluster residency 316. These metrics are briefly summarized below and are described in greater detail in Applicant's co-pending U.S. patent application Ser. No. 15/996,469, entitled "Scheduler for AMP Architecture Using a Closed Loop Performance and Thermal Controller," which was filed on Jun. 2, 2018, and is hereby incorporated by reference in its entirety, together with the references incorporated therein.

Work interval utilization is a measure of proximity of thread completion to a user-visible deadline. Many workloads are targeted towards a user-visible deadline, such as video/audio frame rate. The processor complex 111 performance provided for such workloads needs to be sufficient to meet the target deadlines, without providing excess performance beyond meeting the respective deadlines, which is energy inefficient.

The I/O transaction rate metric computes the number of I/O transactions measured over a sampling period and extrapolates it over a time period. An input/output (I/O) bound workload, such as block storage I/O 115, interacts heavily with non-processor complex subsystems such as storage or a network. Such workloads typically exhibit low processor complex utilization; however, the critical path of the workload includes some time spent on the processor complex 111. A purpose of the processor complex utilization metric 314 is to characterize the ability of a workload to exhaust the serial cycle capacity of the system at a given performance level, where the serial cycle capacity examines the utilization of the processor complex as a whole. The processor complex utilization metric 314 can be defined as a "running utilization", i.e., it captures the time spent on-core by threads. Processor complex utilization metric 314 can be sampled or computed from metrics provided by the processor complex scheduler 210.

Performing closed loop control around the processor complex utilization metric 314 for a thread group will give higher execution throughput to this thread group once it eventually goes on-core, the idea being to try and pull in the completion time of the threads of the thread group to better approximate what they would have been in an un-contended system.

Scheduling latency metric 315 can be provided by a processor complex scheduler. Scheduling latency 305, which can measure an amount of latency that threads in a thread group experience between a time that a thread of a thread group is scheduled and the time that the thread is run on a core of the processor complex 111, can be sampled for a window of time for a thread group and provided to CLPC 300 as a scheduling latency metric 315. In one embodiment, thread scheduling latency metric 315 serves as a proxy for the runnable utilization of a thread group if runnable utilization cannot be directly determined from the processor complex 111. The processor complex scheduler can determine when a thread of a thread group went on core, then off core. For all threads in the thread group, processor complex scheduler can determine how much time the thread group spent running on cores. For each sampling period, CLPC 300 can measure the maximum scheduling latency experienced by threads of a thread group.

Each of the above metrics 311-315 can be fed to a tunable controller, e.g., 321-325 that outputs a contribution to a control effort for threads of the thread group. Each tunable controller 321-325 can have a target value, e.g., T_PT for working interval utilization 311, and a tuning constant Ki. An integrator 340 sums the contributions and generates a unitless control effort for the thread group in the range of 0 to 1 that is used as an index into a performance map 345.

Cluster residency metric 316 can be a cluster residency 306 sampled for a window of time for a thread group. Cluster residency 306 can measure an amount of time that threads of a thread group are resident on a cluster of cores, such as E-cores or P-cores (or GPU cores, neural engine cores, or other types of cores such as an image signal processor, a scaling and rotating engine, etc.). In an embodiment, cluster residency metric 316 can have sample metric for each of one or more cluster of core types.

The CLPC 300 output is a control effort, an abstract value on the unit interval (i.e., a value between 0 and 1) that expresses the relative machine performance requirement for a workload. The control effort is used as an index into a performance map 345 to determine a recommended cluster type (i.e., processing element type) and dynamic voltage and frequency scaling (DVFS) state for the thread group. Recommended DVFS states may be limited to reduce heat and/or to conserve power.

Figure 3:
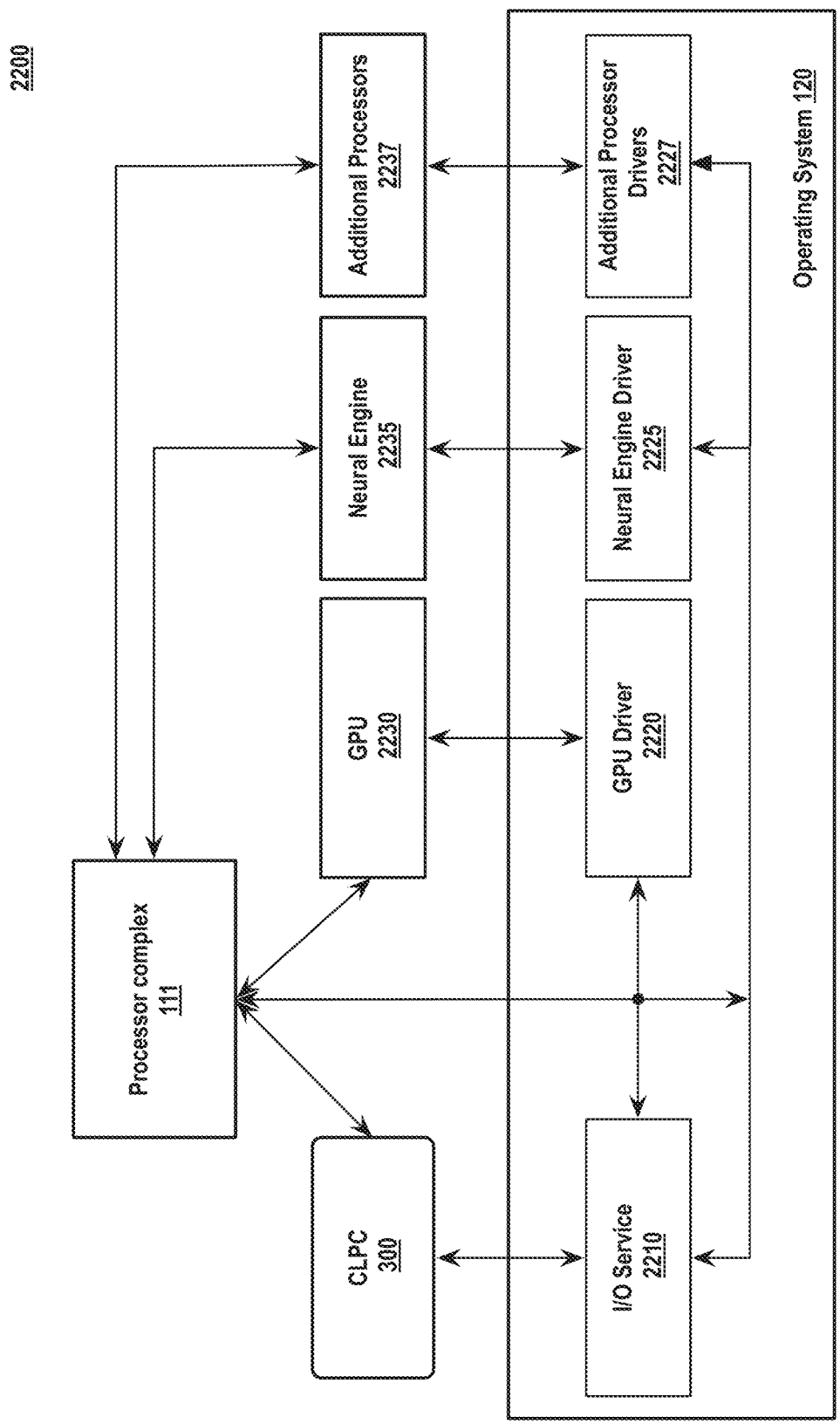
FIG. 3 illustrates a system to maintain performance metrics for workloads spanning multiple agents.

FIG. 3 illustrates a system 2200 to maintain performance metrics for workloads spanning multiple agents, according to an embodiment. In the context of the embodiments described herein, an agent is a processing agent that can process workloads. The processor complex 111 is one type of processing agent. Additional agents can include but are not limited to a graphics processing unit (GPU) 2230, a neural engine 2235, and one or more additional processors 2237, such as image signal processors, scaling and rotating engines, etc. In one embodiment, threads executing on the processor complex 111 can offload workloads to the GPU 2230, neural engine 2235, and additional processors 2237 that may reside within the system 2200.

The processor complex 111 contains some number of CPU clusters, each cluster containing some number of CPU cores. The clusters and cores are managed by the operating system 120, with the various CPU cores acting as application processors for programs executing on the operating system 120. The GPU 2230 includes one or more graphics processor cores that perform graphics specific operations. The GPU 2230 can additionally be configured to perform at least a subset of general-purpose processing operations. The neural engine 2235 can be neural network accelerator or another processing unit configured to perform processing operations for neural network algorithms. The neural engine 2235 is optimized for neural network acceleration, and also implements some basic primitives that can also be used for a subset of general-purpose operations. The GPU 2230 and neural engine 2235 can perform operations at the request of application processors within the processor complex 111. The additional processors 2237 can include an image processor, a sensor processor, or other processing elements within the system 2200. While the GPU 2230 and neural engine 2235 are illustrated as separate from the processor complex 111, in some embodiments the GPU 2230, neural engine 2235, and other co-processors (e.g., image processors, sensor processors, etc.) can be integrated into the processor complex 111. In one embodiment, a thread executing on an application processor can offload a workload by submitting a command buffer to the GPU 2230, neural engine 2235, or additional processors 2237. The command buffer can include a set of commands to be performed on behalf of the submitting thread. The co-processor can process the set of commands and return results to the processor complex 111.

The system 2200 additionally includes the CLPC 300, which acts as the performance and power manager for the system. In some embodiments the CLPC 300 is integrated into the operating system 120, as illustrated in FIG. 1. In one embodiment, the CLPC 300 can be outside of the operating system 120, as illustrated in FIG. 3. In one embodiment the operating system 120 includes an I/O service 2210, which includes a set of system libraries and/or frameworks that can be adopted by drivers (e.g., GPU driver 2220, neural engine driver 2225, additional processor drivers 2227) that manage co-processors within the system 2200. The I/O service 2210 allows other components of the operating system 120 and the CLPC to communicate messages with those drivers. The I/O service 2210 enables the operating system 120 to include work offloaded to co-processors as part of a thread group, which enables CLPC 300 to track performance and efficiency metrics for workloads that span the CPU, GPU, and other co-processors. In one embodiment, when a command buffer or another batch of commands is received at the GPU driver 2220, neural engine driver 2225, or additional processor drivers 2227, the drivers can signal the CLPC 300 via the I/O service 2210 that a workload has been submitted for processing.

The signal can be performed by calling the CLPC 300 or a software module associated with the CLPC 300. For example, the co-processor driver can use the I/O service 2210 to call a WorkSubmit interface to indicate details about the submitted workload, as well as information on the submitting thread of the workload. The information on the submitted workload can include a priority or quality of service classification for the submitted workload and/or a priority or quality of service classification associated with the submitting thread. The I/O Service 2210 can then generate a token in response to the message, where the token is an identifier that can be used to tie metrics associated with the offloaded workload to the submitting thread. For example, in one embodiment the token can be used to identify the thread group associated with the submitting thread of the workload, where the thread group is the repository of metrics associated with the group. In one embodiment, the token also keeps the thread group alive by taking a reference on the thread group object. Accordingly, even if all other references to the group are released while the workload has been offloaded to a co-processor, the thread group and associated metrics will remain allocated because of the reference associated with the token.

In one embodiment, upon beginning of the offloaded workload on the co-processor, the co-processor driver, or another thread associated with the co-processor driver, can call a WorkBegin interface with the token received from the I/O service 2210. The CLPC 300 can tie the WorkBegin call to the previously WorkSubmit call using the token, even if the calling thread group of WorkBegin differs from the calling thread group of WorkSubmit. Upon completion of the workload, the co-processor driver, or an associated thread, can inform the CLPC 300 via a WorkEnd call that also includes the token. In one embodiment, the WorkBegin and WorkEnd call can each be used to return a collection of metrics for the workload that were gathered by the co-processor driver. In one embodiment, upon receipt of the WorkEnd call, the CLPC 300 can retrieve metrics for the workload from the co-processor driver. The CLPC 300 can then integrate the workload metrics into the performance and efficiency metrics for the submitting thread group. If the submitting thread is part of a thread group that is associated with a work interval object, adjustments can be made to the DVFS state for the processor complex 111 or co-processor based on processor performance relative to the WIO deadlines. Additionally, the reference on the thread-group object taken by the token is released during the WorkEnd call, allowing the thread-group object to be released if no other references are held.

It will be understood that the concepts described herein can be applied to a system including any number of GPUs, neural engines, or other co-processors, and are not limited to systems having a single instance of these co-processors. Furthermore, when threads are offloaded from a processor to a co-processor, threads can offload work to some allocated subset of the available co-processor instances within the system, rather than using all available co-processor instances.

FIGS. 4-7 illustrate methods to track performance and efficiency metrics for offloaded workloads, according to embodiments described herein. The offloaded workload metrics, in various embodiments, can include any of the thread execution metrics described herein, including work interval utilization metrics. Thread execution metrics can additionally include timing metrics, such as a time between initial submission of a command buffer and the beginning of command buffer execution and/or the time between Work-Begin and WorkEnd calls. The thread execution metrics can additionally include a number of processor or co-processor cycles between WorkBegin and WorkEnd calls, number of co-processor instructions executed to perform the offloaded work, or other metrics that can be used to gauge co-processor efficiency or performance during execution of the offloaded workload.

Some operations described below can be performed by the hardware of a co-processor, firmware modules, or software modules associated with the co-processor. The methods can be used to track metrics for a variety of co-processors, including but not limited to GPUs, neural engines, image processors, audio processors, and other processors that can co-operate with application processors within a computing system. Furthermore, in some embodiments the concepts described herein can be applied to any variant or type of accelerator devices, including scaler/rotator blocks or encoder/decoder blocks.

Figure 4:
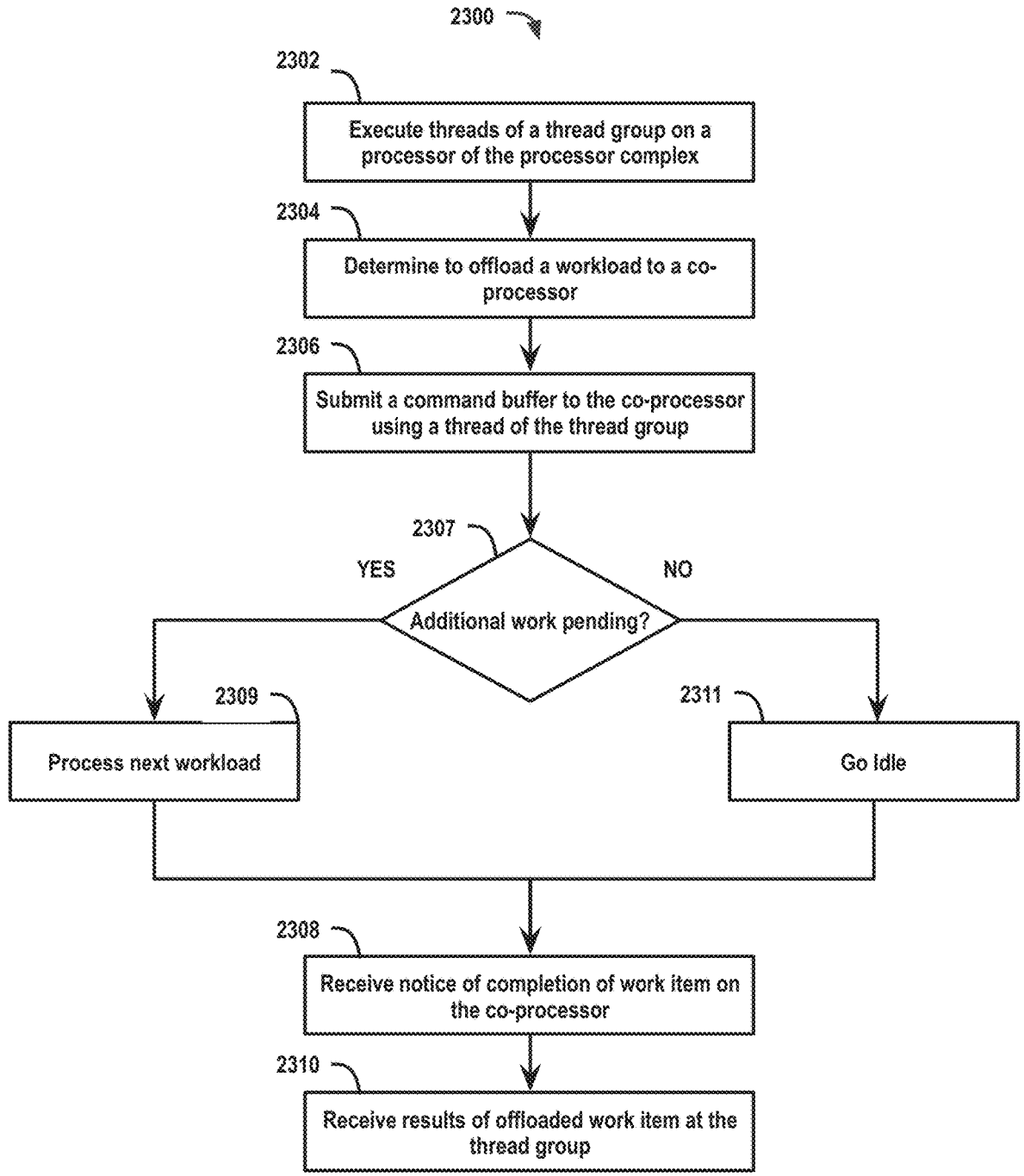
FIG. 4 illustrates a method to offload a workload to a co-processor.

FIG. 4 illustrates a method 2300 to offload a workload to a co-processor, according to an embodiment. The method 2300 can be performed by an application processor within a processor complex 111 described herein, with some operations performed by software threads executing on one or more application processors.

In one embodiment, the method 2300 includes operation 2302, which executes threads of a thread group on a processor of the processor complex. A scheduler for the processor can schedule threads of the thread group on the recommended core type at the recommended DVFS state for the thread group.

In operation 2304, one or more of the threads can determine to offload a workload to a co-processor. The workload to offload may be a workload most suited for processing on the co-processor. For example, a graphics processing workload can be offloaded to a GPU. A facial recognition or face detection workload can be offloaded to a general-purpose GPU (GPGPU) or another parallel compute engine, such as the GPU 2230 and/or neural engine 2235 of FIG. 3.

In operation 2306, the offloading thread of the thread group can submit a command buffer to the co-processor. The offloading thread can submit the command buffer via a driver associated with the co-processor, such as a GPU driver 2220, a neural engine driver 2225, or another software driver associated with the co-processor.

In operation 2307, the thread group can determine if any additional work is pending. If additional work is pending for the thread group, in operation 2309 the thread group process the next workload. If no additional work is pending, in operation 2311 the thread group can go idle and yield the processor to other threads. The application processor can then process additional threads or go idle if no additional threads are enqueued for processing.

In operation 2308, the thread group can receive notice of completion of the workload on the co-processor. Operation 2308 can be performed after the thread or thread group is resumed from an idle or sleep state if no work was available for processing during the offload. As a result of the thread or thread group going idle, the processor on which the thread or thread group was executing may have been transitioned into a different DVFS state.

In operation 2310, the thread or thread group can receive results of the offloaded workload. As a result of performance and efficiency metrics gathered from the co-processor during the offload, the DVFS state of the processor executing the thread or thread group can be pre-adjusted to the appropriate DVFS state to enable the efficient processing of the received results.

Figure 5:
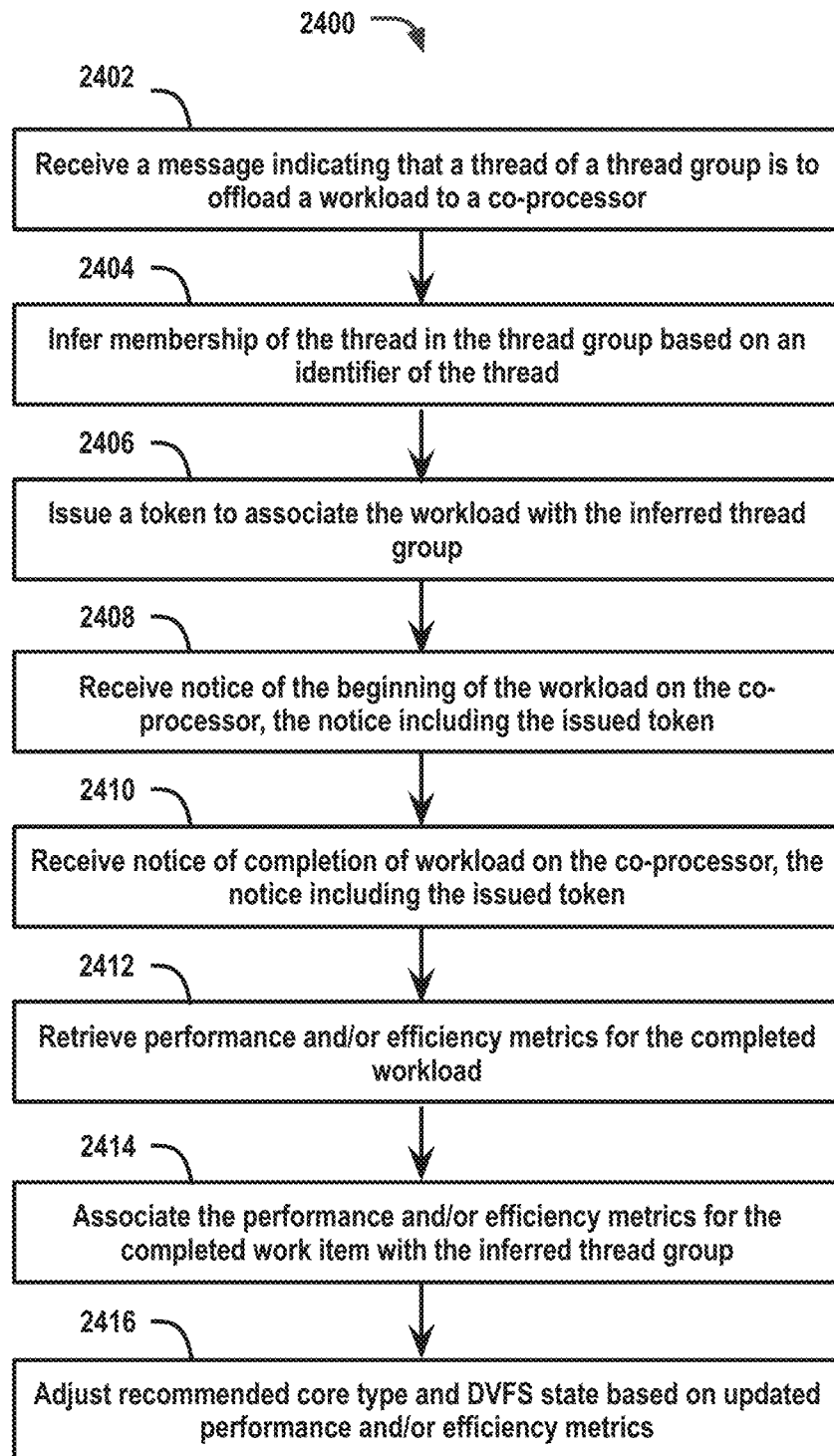
FIG. 5 illustrates a method of tracking performance metrics for an offloaded workload.

FIG. 5 illustrates a method 2400 of tracking performance metrics for an offloaded workload, according to an embodiment. The method can be performed by a CLPC as described herein (e.g., CLPC 300) to associated performance and/or efficiency metrics gathered for offloaded workloads with the thread group associated with the offloaded workload.

Method 2400 includes operation 2402, in which the CLPC receives a message indicating that a thread of a thread group is to offload a workload to a co-processor. The message can be sent from the co-processor or co-processor driver in response to receipt of one or more command buffers of commands to be executed on behalf of the offloading thread. An identifier of the thread that is offloading the workload can be received with the message. In one embodiment, the message is, or is associated with, a Work-Submit call into a software interface for the CLPC. For example, a co-processor driver can use an interface provided via the I/O service to call into a software interface of the CLPC.

In operation 2404 the CLPC can infer membership of the thread in the thread group based on an identifier of the thread using stored or accessible information regarding thread groups and thread-group membership. In one embodiment, priority information associated with the workload can also be determined from context information associated with the thread group.

In operation 2406 the I/O service can issue a token to the co-processor driver. The token can be used to associate the workload with the inferred thread group. Some time period may lapse between the submission of the workload to the co-processor and the beginning of workload execution on the processor. The token can be used to connect subsequent calls regarding the workload to the initial WorkSubmit call, allowing different threads or thread groups to issue Work-Begin and WorkEnd calls on behalf of a workload. Internally, the CLPC can create data structure entries to record metrics for the workload. The metrics can be indexed within the data structure according to the token issued to the co-processor or co-processor driver. For example, the CLPC can record a timestamp associated with a time of submission of the workload to the co-processor. The timestamp can be stored in a data structure at a location identified by the token or an identifier associated with the token. In one embodiment, the token can be an object associated with metrics for the workload.

In operation 2408, the CLPC can receive notice of the beginning of the workload on the co-processor, the notice including the issued token for the workload. This notice can be associated with a WorkBegin call made via the I/O service. In one embodiment the CLPC can record a timestamp associated with the beginning of the workload on the co-processor. The notice of the beginning of the workload on the co-processor can be provided by a different thread group than the thread group that caused the submission of the message in operation 2402.

In operation 2410, the CLPC can receive notice of completion of workload on the co-processor, the notice including the issued token for the workload. In one embodiment the CLPC can record a timestamp associated with the end of the workload on the co-processor.

In operation 2412, the CLPC can retrieve performance and/or efficiency metrics for the completed workload. In one embodiment the performance and/or efficiency metrics for the completed workload include timing metrics for the submission, beginning, and end of processing for the workload on the co-processor. In one embodiment, the metrics additionally include performance and/or efficiency metrics gathered by the co-processor or co-processor driver and submitted to the CLPC. In one embodiment, performance metrics for the workload are stored in memory accessible to the CLPC, which can retrieve the metrics for a workload. In such embodiment, the metrics for a workload can be made accessible to the CLPC after the workload completes execution, although at least some of the metrics may be available during workload execution. Further in such embodiment, the stored metrics may be indexed by, or otherwise made accessible by an identifier based on the token issued by the CLPC upon notice of submission of the workload.

At operation 2414, the CLPC can associate the performance and/or efficiency metrics for the completed workload with the thread group to generate updated metrics for the thread group. The performance and/or efficiency metrics for the completed workload can be integrated with the existing or historical metrics for the thread group.

At operation 2416, the CLPC can adjust a recommended core type and DVFS state based on the updated performance and/or efficiency metrics. Based on the performance metrics for the workload during execution on the co-processor, the thread group may be recommended for a different core type and/or the DVFS state for the core executing the associated thread group can be adjusted. For example, under circumstances where the performance of efficiency of workload execution on a co-processor can be improved by increasing the frequency of the application processor, the DVFS state for the application processor can be adjusted. In one embodiment, the CLPC can also adjust the DVFS state of the co-processor on which the workload is executed. Additionally, other techniques can be applied to adjust the performance and/or efficiency of the co-processor, including limiting the number of co-processor cores used to execute a workload, duty cycling the co-processor, or other techniques which can be used to manage the performance, processing efficiency, or power consumption of a co-processor.

Figure 6:
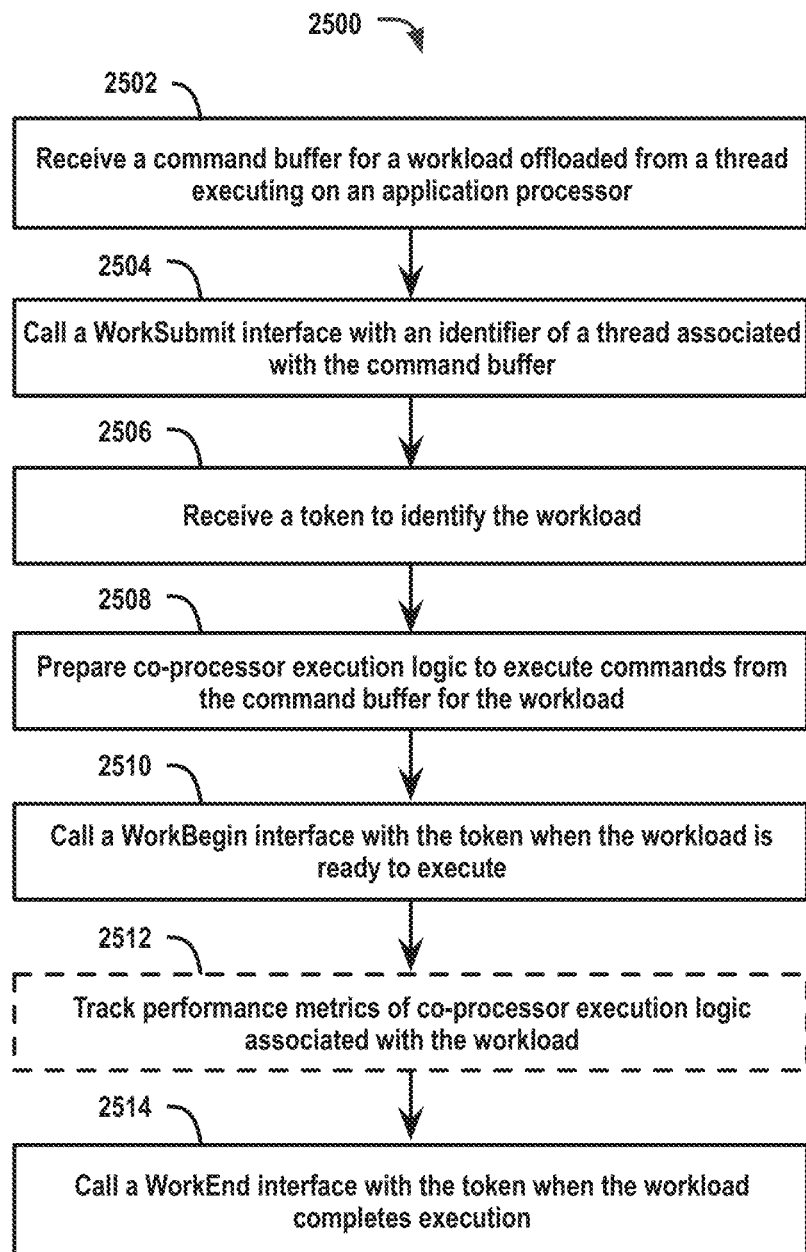
FIG. 6 illustrates an additional method of tracking performance metrics for an offloaded workload.

FIG. 6 illustrates an additional method 2500 of tracking performance metrics for an offloaded workload, according to an embodiment. In one embodiment, method 2500 can be performed by a driver associated with a co-processor, such as, but not limited to the GPU driver 2220 or neural engine driver 2225 of FIG. 3, or a kernel thread group associated with such drivers. In other embodiments, logic within a co-processor, such as firmware or microcontroller logic, can perform the method 2500. In such embodiments, operations described below as being performed by the co-processor driver can be performed by an operating environment executed on the co-processor.

In one embodiment, method 2500 includes operation 2502 to receive a command buffer for a workload offloaded from a thread executing on an application processor, such as an application processor executing within the processor complex. For example, a thread on an application processor can submit a buffer of commands to a GPU to render a window of a user interface. A thread on the application processor can also submit a buffer of commands to a neural engine to perform a facial recognition operation. The command buffer can be received by a co-processor driver, which in one embodiment is also executing on the application processor.

In operation 2504, a thread group associated with the co-processor driver can call a WorkSubmit interface of the CLPC via the I/O service. The call can include an identifier of a thread associated with the command buffer received in operation 2502. The WorkSubmit interface can be called via a software library or module that provides a software interface to the CLPC. In one embodiment the co-processor driver can access the software interface to the CLPC via an I/O service (e.g., I/O service 2210) provided by an operating system of a computing system described herein (e.g., operating system 120 of system 2200). In one embodiment, the WorkSubmit interface can be used to convey priority or quality of service information about the workload to be offloaded. In one embodiment, priority or quality of service information can be determined automatically from context information of the submitting thread.

In operation 2506, the co-processor driver can receive a token to identify the workload. The token can be used to tie the beginning and end of processing for the workload with the initial workload submit call. In one embodiment the token can be used to index or identify performance metrics generated for the workload. While in one embodiment the token is received from the I/O service, the token used to track workloads can be generated by other components within the system, such as but not limited to the CLPC.

In operation 2508, the co-processor driver can prepare co-processor execution logic to execute commands from the command buffer for the workload. The co-processor driver can configure a thread dispatcher or scheduler on the co-processor to schedule internal co-processor operations based on commands specified in the command buffer. For example, the internal co-processor operations can be performed by hardware threads within execution units of the co-processor. The internal execution architecture of the co-processor can vary between co-processors.

In one embodiment, as shown in operation 2510, a thread group associated with the co-processor driver can call a WorkBegin interface of the CLPC when the workload is ready to execute. The call to the WorkBegin interface can include the token or a reference to the token for the workload. In one embodiment, the call to the WorkBegin interface can be performed by a thread group of the operating system kernel. The kernel thread group can call the WorkBegin interface in conjunction with submitting a command buffer to the co-processor on behalf of the co-processor driver. In one embodiment, the call to the WorkBegin interface can be used to convey metrics about the current performance state of the co-processor the CLPC. In one embodiment, metadata to enable estimation of amount of time it will take to perform a task can be passed during the WorkBegin call. In one embodiment, current co-processor load information can be conveyed during the WorkBegin call. In one embodiment, where multiple available co-processor or co-processor cores of a given type are available, the WorkBegin call can convey which of the available co-processor cores will be used to process the workload on the co-processor. The CLPC can use this submitted information to balance the overall power consumption of the system while offloaded work is being performed.

The co-processor driver, in one embodiment, can perform an optional operation 2512 to track performance metrics of co-processor execution logic associated with the work load. In addition to timestamp-based metrics gathered by the CLPC based on the WorkSubmit, WorkBegin, and WorkEnd calls, the co-processor may also record internal performance metrics that can be gathered, recorded, or monitored by the co-processor driver. These performance metrics can be reported to the CLPC or stored in memory that is accessible by the CLPC.

In operation 2514, the co-processor driver can call a WorkEnd interface of the CLPC with the token when the workload completes execution. Optionally, performance metrics captured by the co-processor driver, or a reference (e.g., pointer) to such metrics, can be provided with or in association with the call to the WorkEnd interface of the CLPC.

Figure 7:
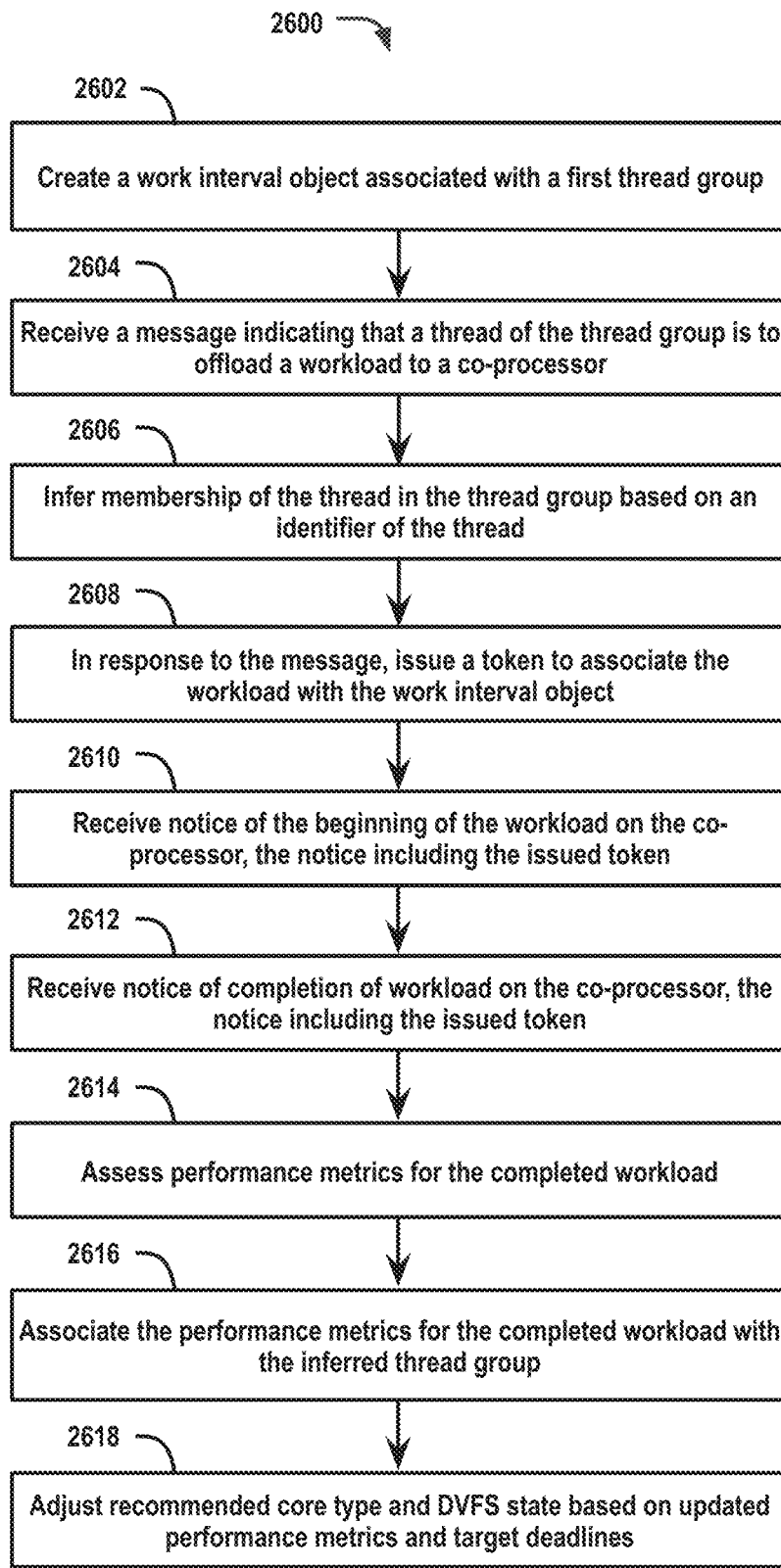
FIG. 7 illustrates a method of tracking performance metrics for an offloaded workload of a work interval object.

FIG. 7 illustrates a method 2600 of tracking performance metrics for an offloaded workload of a work interval object, according to an embodiment. Method 2600 can be performed when the thread group of the offloading thread is associated with a Work Interval Object as described herein. Method 2600 can be performed by a combination of operating system components, hardware components, and software components associated with the CLPC and co-processors.

The method 2600 includes operation 2602 to create a work interval object associated with a first thread group. A work interval object can be created in several ways. There can be a set of predefined work interval objects in an operating system, daemon, framework, or application. A kernel of an operating system can create a work interval object explicitly, such as on behalf of a driver. A kernel of an operating system can implicitly create a work interval object on behalf of an application, such as in response to an application call to a framework.

In operation 2604, the CLPC can receive a message indicating that a thread of the thread group is to offload a workload to a co-processor. Operation 2604 can be performed in a similar manner as operation 2402 of FIG. 5. For example, the message can be sent from the co-processor or co-processor driver in response to receipt of one or more command buffers of commands to be executed on behalf of the offloading thread and an identifier of the thread that is offloading the workload can be received with the message.

In operation 2606, the CLPC can infer membership of the thread in the thread group based on an identifier of the thread. In one embodiment, priority information associated with the workload can also be determined from context information associated with the thread group.

In operation 2608, in response to the message, the I/O service used to interface a co-processor driver with the CLPC can issue a token to associate the workload with the work interval object. In operation 2610, the CLPC can receive notice of the beginning of the workload on the co-processor, the notice including the issued token for the workload. In one embodiment the CLPC can record a timestamp associated with the beginning of the workload on the co-processor. In operation 2612, the CLPC can receive notice of completion of workload on the co-processor, the notice including the issued token. In one embodiment the CLPC can record a timestamp associated with the end of the workload on the co-processor.

In operation 2614, the CLPC can assess performance metrics for the completed workload. Assessing the performance metrics can include analyzing timestamps recorded by the CLPC, or software associated with the CLPC, in response to receipt of the WorkSubmit, WorkBegin, and WorkEnd. Those timestamps can be used to determine the time between the submission of the workload to the co-processor and the beginning of the workload on the co-processor, as well as the time required to complete the workload on the co-processor.

In operation 2616, the CLPC can associate the performance metrics for the completed workload with the thread group to generate updated metrics for the thread group. The updated metrics can be generated by integrating the new metrics with the existing or historical metrics for the thread group.

At operation 2618, the CLPC can adjust a recommended core type and DVFS state based on the updated performance metrics and target deadlines. Based on the performance metrics for the workload during execution on the co-processor and the performance of the thread group relative to the work interval object deadlines, the thread group may be recommended for a different core type and/or the DVFS state for the core executing the associated thread group can be adjusted. In one embodiment, the CLPC can also adjust the DVFS state of the co-processor on which the workload is executed.

In one embodiment, to before adjusting the DVFS state of the co-processor on which the workload is executed to increase the voltage or frequency of that co-processor, the CLPC can reduce the voltage or frequency of other co-processors within the system to keep an overall system power consumption below a threshold. For example, the voltage and frequency of processors or co-processors within a system that are not actively performing operations can be reduced, while increasing the voltage and frequency of other co-processors within the system.

In one embodiment, workloads offloaded to co-processors can be tracked on a per-instance basis. The token that is associated with a workload can be associated with a specific instance of the workload. For example, a WIO can be associated with a thread group that is to generate content for each frame to be displayed by a graphical system. Each frame to be generated can be assigned a work interval instance identifier that uniquely identifies the workload instance associated with that frame. In one embodiment, metadata for each workload can be tracked on a per-instance basis. For example, a thread priority or quality of service classification associated with the workload can be tracked on a per-frame basis.

In one embodiment, the instance identifier can be associated with the token that is provided by the I/O service in response to a call to the WorkSubmit interface. The instance identifier can be used to allow metrics for multiple instances of workloads associated with the same WIO to be tracked. Enabling the tracking of separate instances of a WIO allows the generation of performance and efficiency metrics for agent-spanning workloads at a per-frame granularity. This per-frame granularity of metrics allows for fine-grained DVFS scaling across the various processing agents within a computing system.

In one embodiment, work interval instancing allows the tracking of offloaded metrics for pipelined work operations associated with an application. For example, a thread group for an application can pipeline workloads for multiple frames of content. Work for each frame can be tracked as a separate work instance interval. Tracking work interval objects on a per-frame, per-instance basis allows the CLPC to determine which of the individual frames that each portion of an application's operations are associated with.

To summarize the foregoing, asymmetric multiprocessors (AMPs) can benefit from the use of various performance metrics relating to the various system components to provide an appropriate level of performance at a minimal power cost. One issue that could arise in prior art multiprocessor systems is that various processors and coprocessors (e.g., CPUs, GPUs, neural engines, and other types of coprocessors) had their own performance controllers that had no knowledge or limited knowledge of the performance of other processors and coprocessors. For example, a CPU performance controller might have had little or no knowledge of or control over the processing specifics of an associated coprocessor, such as a GPU or neural engine. As a result, a CPU might submit a workload to a coprocessor and, having no significant further workload (at least until the coprocessor returns the completed workload), transition to a lower power, lower performance state. (See, e.g., block 2311 of FIG. 4.)

In such a case, the CPU performance controller might ramp down the performance of the CPU to a lower performance/lower power consumption state while the coprocessor was executing, only to have to ramp up again very shortly thereafter when the workload returned from the coprocessor. Because transitioning power states requires a finite period of time, and because the CPU performance controller (e.g., CLPC 300) is largely a backwards-looking controller mechanism, a significant performance penalty might be associated with this transition. Depending on the timing involved, the amount of power saved might not justify the performance penalty. Thus, in some cases it might be preferable to keep the CPU in a higher performance state (even without additional workload currently pending and even though more power would be consumed), because the increase in performance sufficiently offsets the increase in power consumption.

This objective may be achieved by adding a certain amount of hysteresis to the CPU performance controller (e.g., CLPC 300) to prevent the CPU from ramping down as quickly. This "Control Effort Hysteresis Approach" is described in greater detail below. As an alternative, rather than keep the CPU in a higher performance state while waiting for the coprocessor (which increases power consumption), it may be desirable to accelerate the CPU's return to a higher performance state when the workload returns from the coprocessor. This "Control Effort Seeding Approach" is also described in greater detail below.

Control Effort Hysteresis Approach

Figure 8:
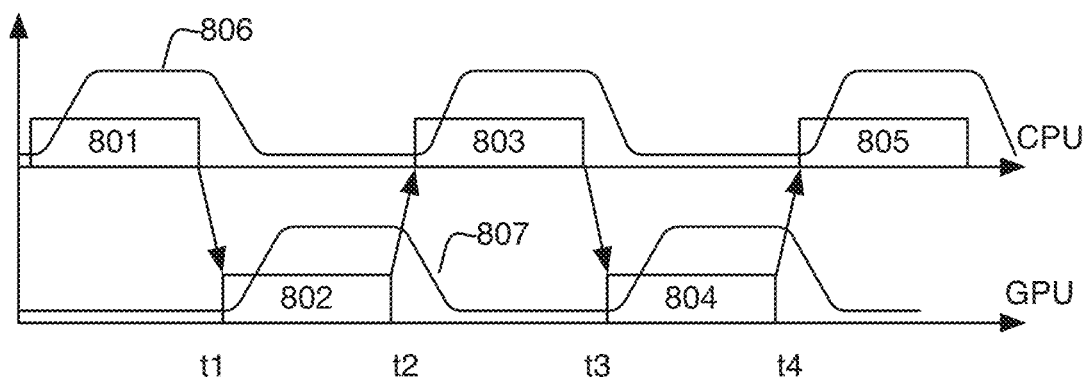
FIG. 8 illustrates a CPU/GPU workload.

An exemplary CPU/GPU workload is illustrated in FIG. 8. Block 801 represents a thread group executing on the CPU. At time t1, this thread group may be offloaded to a coprocessor, such as a GPU. The thread group now executing on the GPU is represented by block 802. At time t2, the GPU may have completed execution of the thread group, meaning the thread group returns to the CPU, where it is identified as block 803. At some time t3, the thread group may again be offloaded to a coprocessor, which may be the same coprocessor as before or another coprocessor, where it is identified as block 804 before returning to the CPU again as block 805 at time t4.

CPU control effort curve 806 illustrates a control effort parameter for the CPU, which may be generated by CLPC 300 according to the various techniques described above and in the referenced co-pending applications. As can be seen in FIG. 8, the control effort for the CPU may initially be at a relatively low value (e.g., a value of zero or near zero) when the CPU is idle. As a thread group begins executing on CPU (represented by block 801), CLPC 300 may begin increasing the control effort 806 according to the various feedback mechanisms described above, until it reaches a relatively high value (e.g., a value of one or near one). Once the thread group is passed to the GPU (where it is represented by block 802), CLPC 300 may decrease the control effort 806, as the CPU is basically idle while the GPU (or other coprocessor) is executing the thread group.

Once the GPU is done with the thread group, it is returned to the CPU (where it is represented by block 803). At this point, CLPC 300 may again increase the thread group's CPU control effort 806 while the thread group is executing on the CPU and decrease the thread group's CPU control effort 806 once the thread group is again offloaded to the GPU (where it is represented by block 804) as discussed above. This process may repeat more or less continuously depending on workload.

GPU control effort curve 807 illustrates a control effort parameter for the thread group on the GPU, which may be generated by a GPU performance controller according to principles corresponding to those discussed above. It will be appreciated that in the illustrated exemplary workload, the control effort for the GPU is basically the inverse of the control effort for the CPU, as the thread group is executing on one or the other at various points in time, with the non-executing processor having no other workloads (in the illustrated example). In the case where there were other thread groups pending in the GPU pipeline, then the thread group's GPU control effort would remain high while executing these other thread groups.

Figure 9:
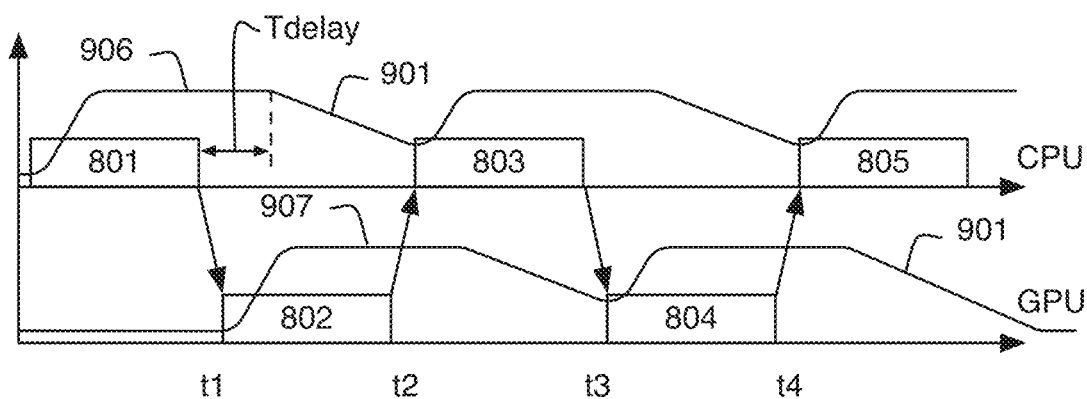
FIG. 9 illustrates a CPU/GPU workload with unwind hysteresis for CPU and GPU control effort.

As discussed above, when the workload transfers from the CPU to a coprocessor (such as a GPU), the amount of time required for the receiving processing unit's control effort to return to a higher level can impose an undesirable performance penalty. However, these effects may be mitigated by increasing an amount of hysteresis employed by CLPC 300 in determining the control effort. This hysteresis may be implemented separately for each processor and/or coprocessor, such that certain coprocessors may have higher, lower, or no hysteresis as appropriate for a given embodiment. FIG. 9 illustrates the workload described above with respect to FIG. 8 in which CLPC 300 employs a higher degree of hysteresis to prevent the thread group's CPU control effort 806 and the thread group's GPU control effort 807 from unwinding to the same degree. This hysteresis may be implemented in terms of a delay between the time at which a workload decrease occurs and the time at which the control effort begins decreasing. This is illustrated in FIG. 9 as a delay time Tdelay between the end of a thread group's execution on a processing unit and the time at which the control effort begins decreasing. Alternatively or additionally, the hysteresis may be implemented as a decrease in the rate at which the control effort decreases. This is illustrated in FIG. 9 as a decreased slope 901 of the decaying control effort while the thread group is offloaded to the coprocessor.

Review of FIG. 9 illustrates certain advantages of this approach. For example, when the thread group returns to the CPU, illustrated as block 803, the increased hysteresis of the thread group's CPU control effort 906 means that the control effort has not decreased all the way to zero. Thus, it takes control effort 906 less time to reach its peak value. As a result of both the increased initial control effort and the decreased time to reach maximum control effort, the thread group will execute more quickly on return to the CPU. As illustrated in FIG. 9, the same hysteresis has been applied to the thread group's GPU control effort 907. Thus, the same performance advantages are achieved with respect to execution on the GPU.

Figure 10:
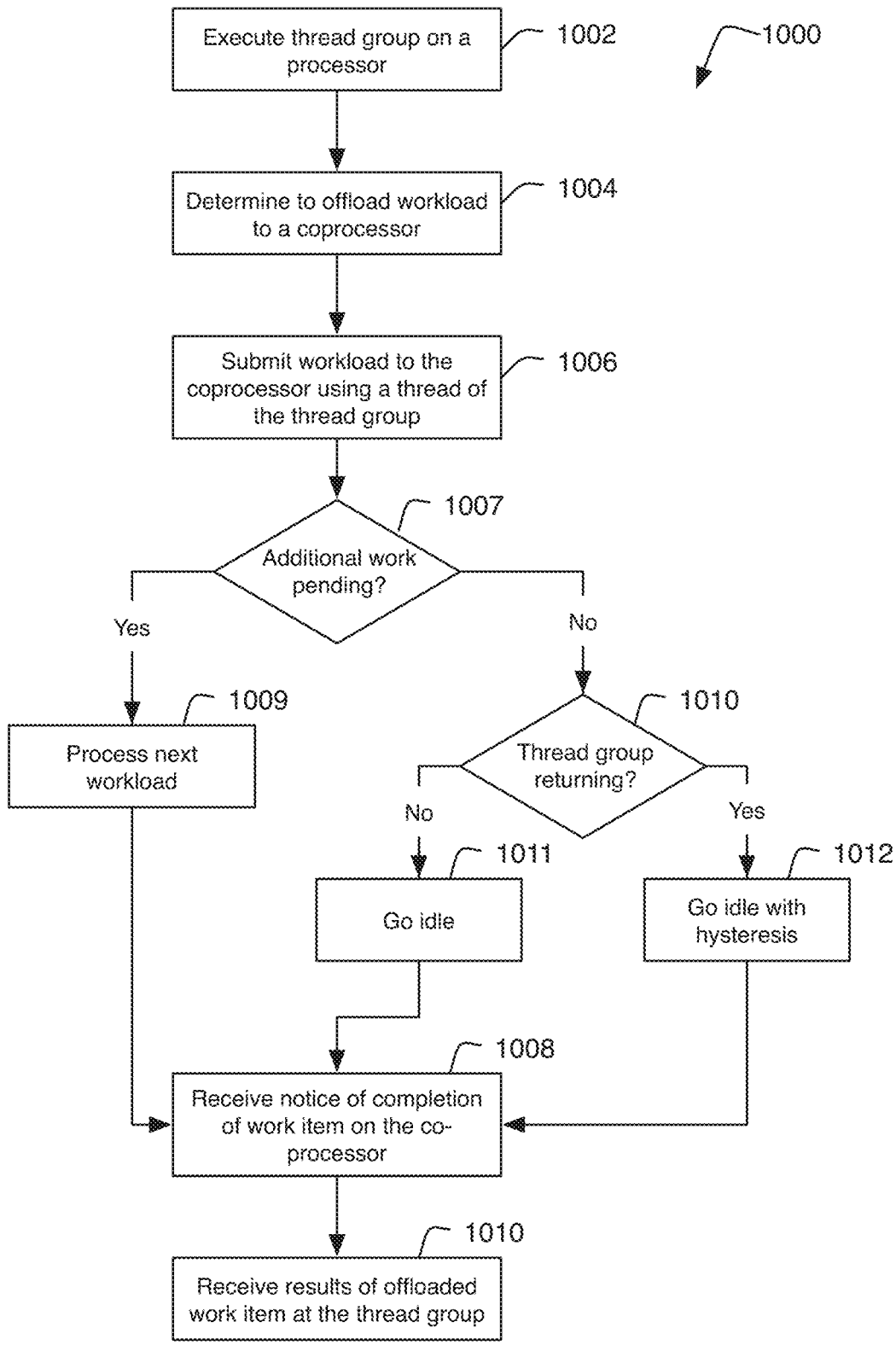
FIG. 10 illustrates a flow chart of a processor/coprocessor control effort management technique implementing increased hysteresis.

FIG. 10 illustrates a flow chart of a processor/coprocessor control effort management technique implementing increased hysteresis as described above with respect to FIGS. 8 and 9. It will be appreciated that FIG. 10 generally corresponds to FIG. 4 discussed above, and the various processes may be implemented in substantially the same way, including the metric tracking techniques depicted in and described with reference to FIGS. 5-7.

FIG. 10 illustrates a method 1000 to offload a workload to a co-processor, according to an embodiment. The method 1000 can be performed by an application processor within a processor complex 111 described herein, with some operations performed by software threads executing on one or more application processors.

In one embodiment, the method 1000 includes operation 1002, which executes threads of a thread group on a processor of the processor complex. A scheduler for the processor can schedule threads of the thread group on the recommended core type at the recommended DVFS state for the thread group.

In operation 1004, one or more of the threads can determine to offload a workload to a co-processor. The workload to offload may be a workload most suited for processing on the co-processor. For example, a graphics processing workload can be offloaded to a GPU. A facial recognition or face detection workload can be offloaded to a general-purpose GPU (GPGPU) or another parallel compute engine, such as the GPU 2230 and/or neural engine 2235 of FIG. 3.

In operation 1006, the offloading thread of the thread group can submit the workload to the co-processor. For example, the offloading thread can submit the command buffer via a driver associated with the co-processor, such as a GPU driver 2220, a neural engine driver 2225, or another software driver associated with the co-processor.

In operation 1007, the thread group can determine if any additional work is pending. If additional work is pending for the thread group, in operation 1009 the thread group process the next workload. If no additional work is pending, the thread group can determine whether the thread group is anticipated to be returning from the co-processor within a certain time frame. If not, in operation 1011 the thread group can go idle and yield the processor to other threads. Alternatively, if the thread group is anticipated to return within a certain time period, in process 1012, the processor can go idle with hysteresis as depicted above in FIGS. 8 and 9. The application processor can thus process additional threads or go idle if no additional threads are enqueued for processing.

In operation 1008, the thread group can receive notice of completion of the workload on the co-processor. Operation 1008 can be performed after the thread or thread group is resumed from an idle or sleep state if no work was available for processing during the offload. As a result of the thread or thread group going idle, the processor on which the thread or thread group was executing may have been transitioned into a different DVFS state.

In operation 1010, the thread or thread group can receive results of the offloaded workload. As a result of performance and efficiency metrics gathered from the co-processor during the offload, the DVFS state of the processor executing the thread or thread group can be re-adjusted to the appropriate DVFS state to enable the efficient processing of the received results.

Turning back to FIGS. 8 and 9, it will be appreciated that employing the control effort hysteresis techniques described above can result in a significant increase in power consumption because both the processor and coprocessor may be kept in a higher DVFS state than warranted by the instantaneous workload of the processor or coprocessor. Thus, in some embodiments it may be better to allow the processor or coprocessor workload to wind down without hysteresis, but to save the control effort state so that it may be more rapidly restored when the thread group returns to the processor/coprocessor. This control effort seeding approach is described more thoroughly below.

Control Effort Seeding Approach

Figure 11:
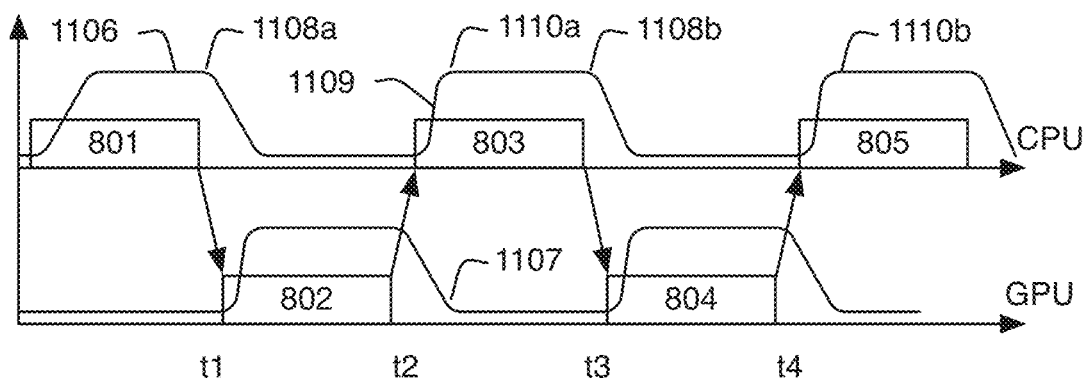
FIG. 11 illustrates an exemplary CPU/GPU workload with control effort seeding.

FIG. 11 illustrates an exemplary CPU/GPU workload like that depicted in FIG. 8, but in which the control effort for a given thread group is stored when the thread group is offloaded to a coprocessor and restored when the thread group returns from the coprocessor. As can be seen in FIG. 11, the control effort for the CPU may initially (i.e., at the beginning of block 801) be at a relatively low value (e.g., a value of zero or near zero) when the CPU is idle. As a thread group begins executing on CPU (represented by block 801), CLPC 300 may begin increasing the control effort 806 according to the various feedback mechanisms described above, until it reaches a relatively high value (e.g., a value of one or near one). Once the thread group is passed to the GPU (where it is represented by block 802), if it is known or determined that the thread group will return from the GPU (or other coprocessor) for further processing, CLPC 300 may store the control effort 1108a at time t1 and then decrease the control effort 806, as, in the illustrated workload, the CPU is basically idle while the GPU (or other coprocessor) is processing the thread group.

Once the GPU is done with the thread group, it is returned to the CPU (where it is represented by block 803) for further processing. At this point, CLPC 300 may retrieve the stored control effort 1108a and rapidly increase the control effort to 1110a (corresponding to the stored value 1108a). This increase may be more rapid than the normal CLPC control loop, as indicated by the increased slope 1109 of thread group's CPU control effort curve 1106. When the CPU is again ready to offload the thread group to the GPU, but it is known that the thread group will return for further processing, then a further control effort value 1108b may be stored, and when the thread group again returns from the coprocessor (805), the control effort may again be rapidly increased to a corresponding value 1110b. The same principles may be applied to the thread group's GPU control effort curve 1107, as depicted in the lower portion of FIG. 11.

Figure 12:
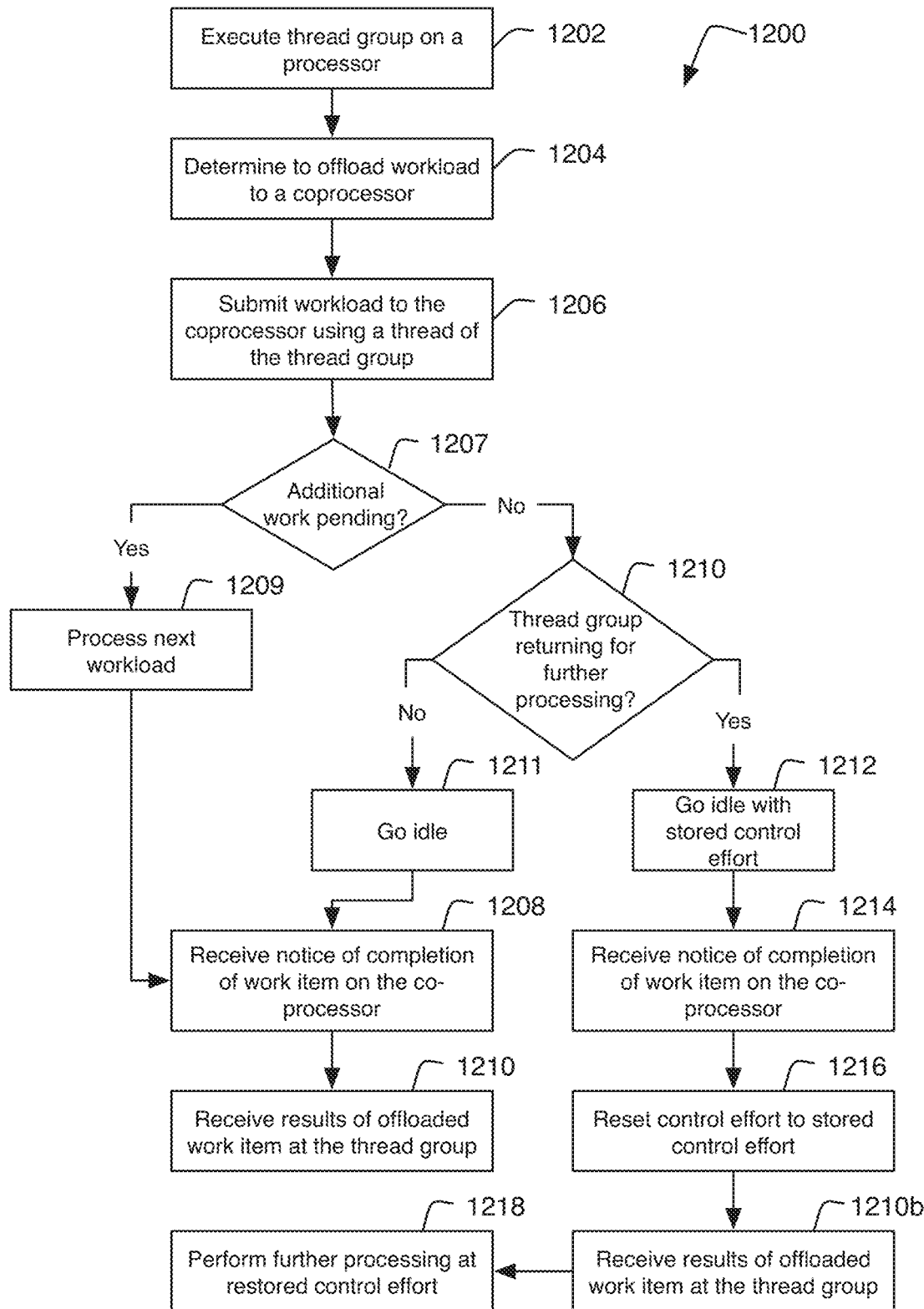
FIG. 12 illustrates a flow chart of a processor/coprocessor control effort management technique implementing control effort seeding.

FIG. 12 illustrates a flow chart of a processor/coprocessor control effort management technique implementing control effort seeding as described above with respect to FIG. 11. It will be appreciated that FIG. 10 generally corresponds to FIGS. 4 and 10 discussed above, and the various processes may be implemented in substantially the same way, including the metric tracking techniques depicted in and described with reference to FIGS. 5-7.

FIG. 12 illustrates a method 1200 to offload a workload to a co-processor, according to an embodiment. The method 1200 can be performed by an application processor within a processor complex 111 described herein, with some operations performed by software threads executing on one or more application processors.

In one embodiment, the method 1200 includes operation 1202, which executes threads of a thread group on a processor of the processor complex. A scheduler for the processor can schedule threads of the thread group on the recommended core type at the recommended DVFS state for the thread group.

In operation 1204, one or more of the threads can determine to offload a workload to a co-processor. The workload to offload may be a workload most suited for processing on the co-processor. For example, a graphics processing workload can be offloaded to a GPU. A facial recognition or face detection workload can be offloaded to a general-purpose GPU (GPGPU) or another parallel compute engine, such as the GPU 2230 and/or neural engine 2235 of FIG. 3.

In operation 1206, the offloading thread of the thread group can submit the work load to the co-processor. For example, the offloading thread can submit the command buffer via a driver associated with the co-processor, such as a GPU driver 2220, a neural engine driver 2225, or another software driver associated with the co-processor.

In operation 1207, the thread group can determine if any additional work is pending. If additional work is pending for the thread group, in operation 1209 the thread group process the next workload. If no additional work is pending, the thread group can determine whether the offloaded thread group is anticipated to be returning from the co-processor for further processing. If not, in operation 1211 the thread group can go idle and yield the processor to other threads. Alternatively, if the thread group is anticipated to return for further processing, in process 1212, the processor can go idle with a stored control effort as described above with respect to FIG. 11. The application processor can thus process additional threads or go idle if no additional threads are enqueued for processing.

In operation 1208, the thread group can receive notice of completion of the workload on the co-processor. Operation 1208 can be performed after the thread or thread group is resumed from an idle or sleep state if no work was available for processing during the offload. As a result of the thread or thread group going idle, the processor on which the thread or thread group was executing may have been transitioned into a different DVFS state.

In operation 1210, the thread or thread group can receive results of the offloaded workload. As a result of performance and efficiency metrics gathered from the co-processor during the offload, the DVFS state of the processor executing the thread or thread group can be pre-adjusted to the appropriate DVFS state to enable the efficient processing of the received results.

Alternatively, if a control effort was stored in block 1212, upon receipt of notice of work item completion on the coprocessor (block 1214), the control effort can be reset to the stored control effort in process 1216. The processor can then receive the results of the offloaded workload in process 1210*b* and can perform the further processing at the restored control effort in block 1218.

Figure 13A:
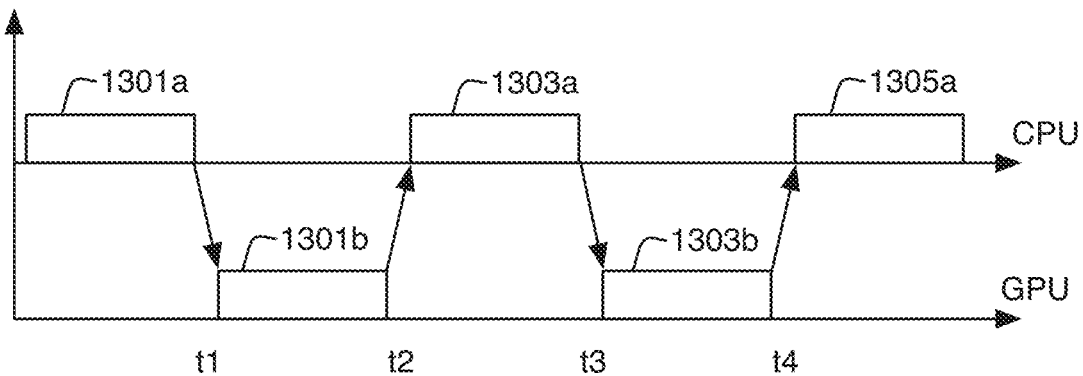
FIGS. 13A-13C illustrate three workloads exhibiting different degrees of serialization.
Figure 13B:
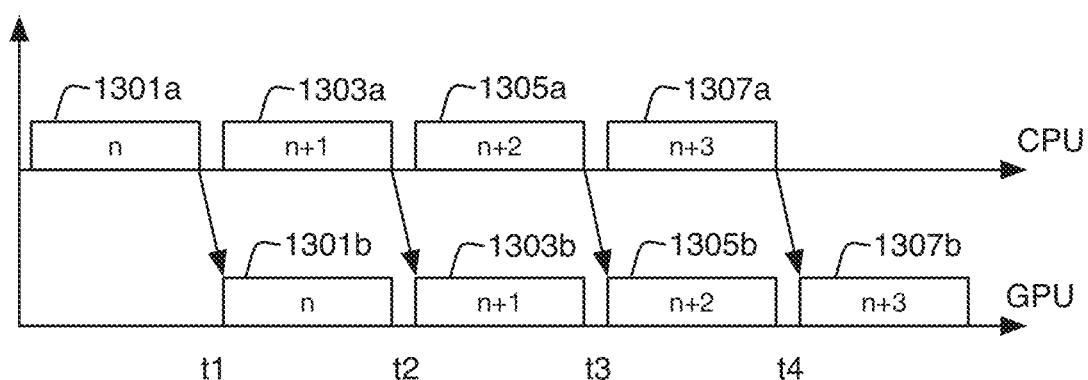
Figure 13C:
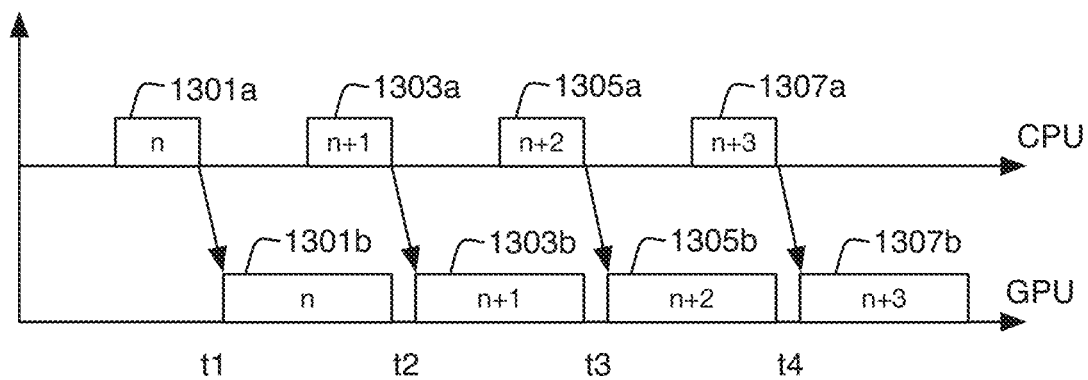

The basic control effort seeding approach described above may be improved by the use of serialization-based control to modify the amount of control effort seeding that is applied depending on the serialization of the workload. FIG. 13A-13C illustrate three workloads exhibiting different degrees of serialization.

FIG. 13A illustrates a workload that is completely serialized, meaning that the thread group is executing entirely on the CPU or entirely on the coprocessor (e.g., a GPU), but never on both. This workload corresponds to the workload discussed above with respect to FIG. 8. A work instance 1301*a* of a thread group executes on a processor (e.g., a CPU), and, at time t1, is offloaded to a coprocessor (e.g., a GPU) where it becomes work instance 1301*b*. When the coprocessor completes work instance 1301*b*, it returns the result to the processor, which may operate on the returned data as work instance 1303*a* and so on. As mentioned above, this load is completely serialized. With such serialized workloads it may be desirable to use the control effort seeding techniques described above to provide enhanced processing performance.

FIG. 13B illustrates a workload that is perfectly pipelined, as opposed to completely serialized). In the illustrated perfectly pipelined workload, the processor (e.g., a CPU) executes a work instance 1301*a* corresponding to the nth frame of a workload. As a non-limiting example, this could be generating a command buffer for the GPU coprocessor to render a frame of a video sequence. At time t1, the processor may offload the workload to a coprocessor (e.g., a GPU) as work instance 1301*b*, which also corresponds to the nth frame the workload. To extend the non-limiting example, this could be the GPU performing the video frame rendering from the received command buffer.

Unlike the completely serialized workload depicted in FIG. 13A, in the perfectly pipelined workload of FIG. 13B, the processor may, upon completion of work instance 1301*a* begin work on work instance 1303*a*, which may correspond to an n+1th frame of the work load. To extend the non-limiting example above, this could be generating a command buffer for the GPU to render a subsequent frame of the video. During the time that the processor is executing work instance 1303*a*, corresponding to the n+1th frame of the workload, the coprocessor (e.g., a GPU) may be executing work instance 1301*b* corresponding to the nth frame of the workload. Thus, the CPU and GPU may be simultaneously processing different portions of the thread group, with each processor running at a high degree of utilization. With such pipelined workloads, it may not be desirable to use the control effort seeding techniques described above, as the control effort control techniques described with respect to FIGS. 3 and 22-26 may provide acceptable performance.

FIG. 13C illustrates a workload that is somewhere between completely serialized and perfectly pipelined, meaning that there is some degree of pipelining between the processor and coprocessor (e.g., CPU and GPU), but in which there is some portion of time during which the processor (e.g., CPU) is waiting for the results of an offloaded work item from the coprocessor (e.g., GPU) or the coprocessor (e.g., GPU) is waiting for a new command buffer from the processor (e.g., CPU). In the illustrative example of FIG. 13C, the processor requires less time to execute its work instances 1301*a*, 1303*a*, 1305*a*, and 1307*a* than the coprocessor requires to execute its corresponding work instances 1301*b*, 1303*b*, 1305*b*, and 1307*b*. It will be appreciated that variations of this workload may also exist. For example, it could be that the coprocessor completes its respective work instances more quickly than the processor such that the coprocessor ends up waiting for further offloaded work instances from the processor. Additionally, the workload could be such that the processor executes other thread group tasks that are not offloaded to the coprocessor, or are offloaded to another coprocessor, during the times that the processor is waiting on the illustrated coprocessor. This type of workload could fill in some of the gaps in the processor load, making it more resemble the perfectly pipelined workload of FIG. 13B.

In workloads like that depicted in FIG. 13C, some degree of control effort seeding may be desirable, but it may perhaps not the same amount as would be applied in the completely serialized case depicted in FIG. 13A. Thus, a degree of serialization parameter may be defined on the unit scale (i.e., a value between 0 and 1) with a value of 0 corresponding to a perfectly pipelined workload as depicted in FIG. 13B, and 1 corresponding to a completely serialized workload as depicted in FIG. 13A. In such a system, the workload depicted in FIG. 13C might have a degree of serialization of 0.5, calculated as described in greater detail below.

In addition to the degree of serialization of a workload, it may be desirable to alter the control effort seeding responsive to the length of time that the workload is executing on a processor or coprocessor. To understand why, consider a first workload that has 50% serialization with an 8 millisecond duration versus a second workload that has a 50% serialization but a 36 millisecond duration. In the former case, CLPC 300 will have much less time (e.g., 8 ms) to reduce the control effort of the processor or coprocessor, and thus it may be the case that the control effort will not have dropped to a level that control effort seeding would achieve any significant performance advantage. Conversely, in the latter case, CLPC 300 will have significantly more time (e.g., 36 ms) to wind down the control effort of the processor or coprocessor. In this latter case, then, there may be significant performance advantages to seeding the control effort as described above.

In addition to the degree of serialization and length of a workload, it may be desirable to alter the control effort seeding responsive to a tuning parameter that may be thought of as a "preference" or "efficiency factor." As described in greater detail below, this tuning parameter may be used to bias the control effort seeding in favor of increased performance or in favor of reduced power consumption. In some embodiments this parameter may be set responsive to a priority of a load. For example, high priority loads may be biased in favor of increased performance, while lower priority loads may be biased in favor of reduced power consumption. Additionally, this parameter may be set based on other system parameters, such as available battery power, whether the task is a background task or a foreground, user-interactive task, etc.

In some embodiments, a control effort floor for a processor may be determined based on the degree of serialization of a workload, the amount of time the workload is active on the coprocessor, and the tunable preference or efficiency factor. The control effort floor may correspond to the control effort to which the processor is returned when an offloaded workload returns from a coprocessor. In the example of FIG. 11 the control effort floor is 1110a for work instance 803 and 1110b for work instance 805. In this example, the control effort floor was equal to the stored control effort from the immediately preceding work instance. However, as noted above, it may be desirable to adjust the control effort floor responsive to the degree of serialization, time of execution, and a tuning factor based on other system requirements.

Figure 14:
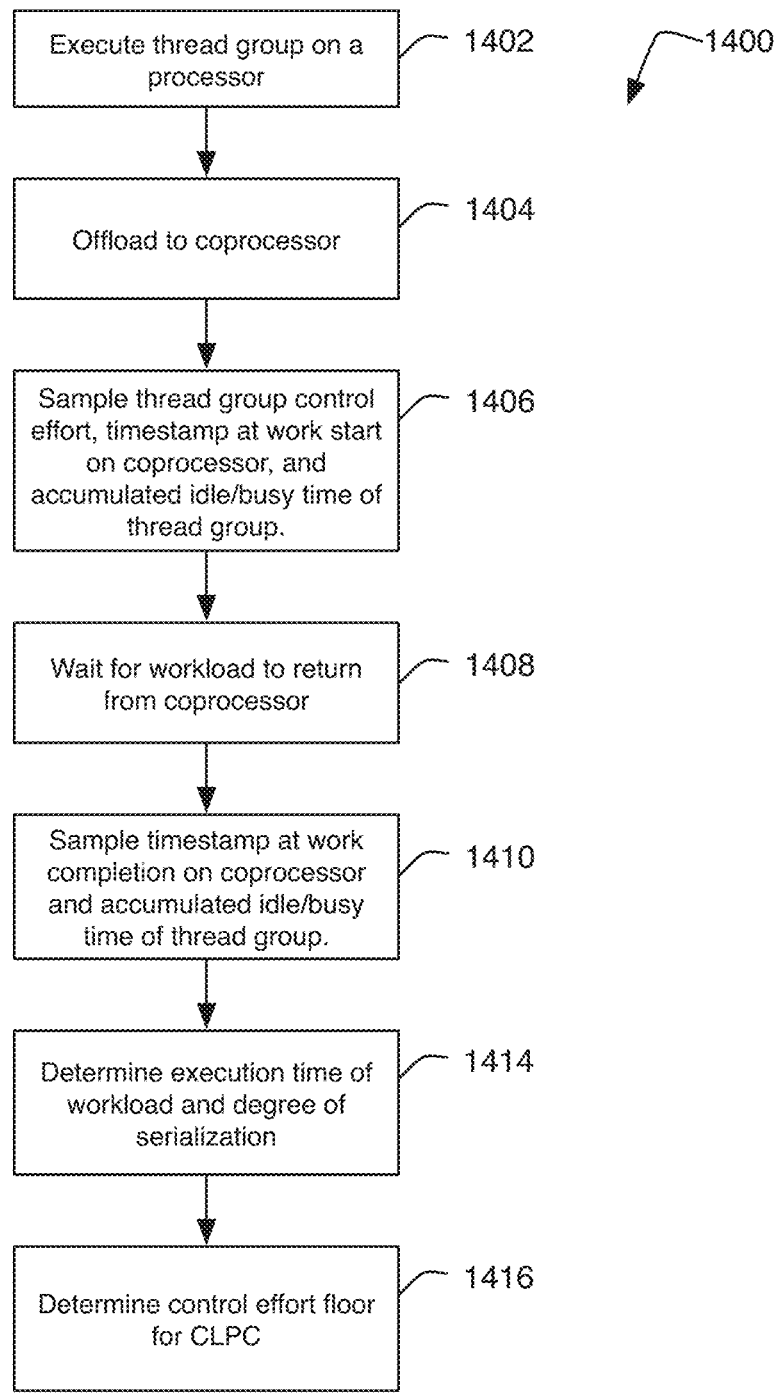
FIG. 14 illustrates a flow chart for a method 1400 of determining a control effort floor.

Therefore, FIG. 14 illustrates a flow chart for a method 1400 of determining a control effort floor. The method begins with a process 1402 in which a thread group is executed on a processor (e.g., instance 1301s of FIGS. 13A-13C). In subsequent process 1404, the thread group is offloaded to a coprocessor (e.g., at time t1 in FIGS. 13A-13C). When the thread is offloaded, CLPC 300 may sample the current control effort (e.g., control effort 1108a in FIG. 11), the time at which the workload instance started on the coprocessor (e.g., t1), and the accumulated idle or busy time of the processor at time t1. Then, in process 1408, the processor waits for the workload to return from the coprocessor. In 1410, CLPC 300 can sample the timestamp at the time the offloaded work instance completed on the coprocessor (e.g., t2 in FIG. 13C) and the accumulated idle or busy time of the processor at time t2.

In process 1414, CLPC 300 can determine the degree of serialization of the workload and the execution time. The execution time may be determined by the subtracting t1 from t2. The degree of serialization of the workload may be determined by dividing the processor busy time between t1 and t2 by the execution time. The processor busy time can be determined by subtracting the cumulative processor busy time sampled at t1 from the cumulative processor busy time sampled at t2. (A corresponding calculation could be made from measured idle times, with the busy time being t2−t1 minus the difference in cumulative idle time.) Thus, in the workload of FIG. 13A, the processor busy time would be 0. The degree of serialization can be calculated as:

$$S = 1 - \frac{t_{PB}}{t_{ex}}$$

where $t_{PB}$ is the processor busy time and S and $t_{ex}$ are as defined above. Thus, in the workload of FIG. 13A, the degree of serialization would be 1, indicating complete serialization. In the workload of FIG. 13B, the processor busy time would be t2 minus t1, which equals $t_{ex}$, and thus the degree of serialization S would be 0, indicating perfect pipelining. In the workload of FIG. 13C, the processor busy time would be approximately one half of t2−t1. Thus, the degree of serialization would be approximately 0.5.

In process 1416, the control effort floor may be determined based on the degree of serialization of a workload, the amount of time the workload is active on the coprocessor, and the tunable preference or efficiency factor. More specifically, the control effort floor may be determined according to the formula:

$$CE_{fl} = S \times f(t_{ex}) \times \alpha \times CE_{st}$$

where $CE_{fl}$ is the control effort floor, S is the degree of serialization of the workload, $f(t_{ex})$ is a function $f$ of the execution time $t_{ex}$ of the workload on the coprocessor, a is the tuning parameter discussed above, and CEst is the stored control effort when the workload is offloaded. Other formulas could also be used if appropriate for a given embodiment. The control effort floor is a value that may be used to seed the integrator of CLPC 300 that sets the control effort parameter.

The function $f$ may take on any of a variety of forms. In some embodiments $f$ may be a linear function having a value 0 at some minimum time that may be determined with respect to the CLPC sample rate and other system parameters and having a value 1 at some maximum time determined as a function of the expected range of execution times for the various workloads. In other embodiments, $f$ may be a threshold function that takes on a value of zero for work instances having a job length less than a threshold and a value of one for work instances having a job length ($t_{ex}$) greater than a threshold. For such a function, the control effort floor would thus be zero for jobs shorter than the threshold, meaning that no control effort seeding would be applied. Similarly, the control effort floor would thus be implemented for jobs longer than the threshold, meaning that the control effort would be seeded to a degree determined by the degree of serialization of the work load and the tuning parameter as discussed elsewhere herein.

Using the formula of the preceding paragraph, assuming perfect serialization, S would have a value of 1. Assuming that the execution time was sufficient to maximize the function $f$ at its value of 1 and the tuning parameter α was also set at 1 (e.g., for a high priority, user interactive process), then the control effort floor $CE_{fl}$ would be set to the same as it was when the thread group was offloaded to the coprocessor, i.e., $CE_{st}$. Conversely, for a perfectly parallel workload, the degree of serialization S would have a value of zero, and the control effort floor would also be zero. Similarly, for a workload in which the execution time $t_{ex}$ on the coprocessor was sufficiently low, $f(t_{ex})$ would have a value of zero, also corresponding to a zero value for the control effort floor. Likewise, if the tuning parameter α were set to zero, corresponding to a low priority or background process, then the corresponding control effort floor would be zero. Finally, for values of the degree of serialization S, the function of the execution time $f(t_{ex})$, and the tuning parameter α falling between these values, the control effort floor will be set to some fraction of the stored control effort at the time the workload was offloaded to the coprocessor.

Deadline Driven Control

There are many types of computing workloads that must be completed by a deadline, but for which it may not be desirable to expend undue computational resources to complete the workload as soon as possible. An example of such workloads is playback of audio and/or video media in a mobile device. If a particular frame of audio or video data is not decoded and rendered in time, playback interruption or other undesirable effects may result. On the other hand, because a mobile device often relies on a finite amount of battery power, unnecessarily increasing processor or coprocessor performance beyond what is necessary to meet the deadline results in unnecessary power consumption that provides no advantage if the computational results are finished before they are needed. Thus, for these types of workloads, it may be desirable to adjust the performance of the processor(s) and/or coprocessor(s) so that the computational workload is completed before, but as close as possible, to some deadline.

Historically, single processor systems have relied on an API providing information such as a start timestamp for a work interval, a finish timestamp for the work interval, and a deadline for the work interval. A work interval is repeating portion of work that executes on a processor. The deadline could be expressed as either an absolute time of completion or as an amount of computation time available. When a work interval is completed, the difference between the absolute deadline and the time of completion, or between the allotted time and the actual time used, can be used as an error signal for a CLPC to servo processor performance (e.g., dynamic voltage and frequency state or DVFS) so that workloads are completed meeting deadlines with a little time to spare. This type of control works well for single processor or homogenous multiprocessor systems but may not be sufficient for heterogenous multiprocessor systems.

Figure 15A:
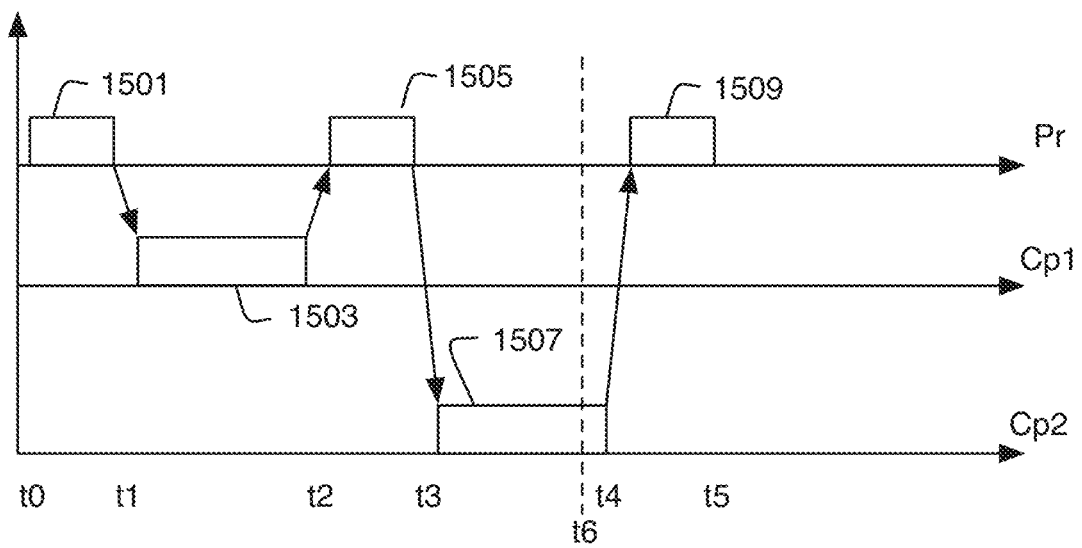
FIG. 15A illustrates an exemplary workload for a multiprocessor system like that in FIG. 3 having a processor complex and first and second coprocessors.

The problem may be understood with reference to FIG. 15, which illustrates an exemplary workload for in a multiprocessor system like that illustrated in FIG. 3, having a processor complex (Pr) (e.g., processor complex 111) and first and second coprocessors Cp1 and Cp2 (e.g., GPU 2230 and neural engine 2235). It will further be appreciated that this arrangement is merely exemplary, various numbers and types of processors and coprocessors could also be used. Additionally, for ease of discussion, the workload illustrated in FIG. 15 is a completely serialized workload, although the load may be also be pipelined.

In any case, the work interval starts on processor Pr with work instance 1501 being performed by the processor. At time t1, the workload is offloaded to coprocessor Cp1 (e.g., GPU 2230) as work instance 1503. At time t2, coprocessor Cp1 has completed work instance 1503, and the workload is returned to processor Pr as work instance 1505. At time t3 processor Pr completes work instance 1505 and offloads the workload to coprocessor Cp2 (e.g., neural engine 2235) as work instance 1507. At time t4, coprocessor Cp2 completes work instance 1507, and the workload returns to processor Pr as work instance 1509, with completion of the entire work interval occurring at time t5. In this example, the total execution time of the work interval is t5–t0. The total time on processor Pr time is t1–t0+t3–t2+t5–t4. The total time on coprocessor Cp1 is t2–t1, and the total time on coprocessor Cp2 is t4–t3.

For sake of discussion, assume the completion deadline for the illustrated work interval was time t6. Because the deadline is missed, a prior art CPU scheduler would speed up processor Pr. However, this might not be a suitable strategy. First, because of the relatively short amount of time the workload spends on processor Pr as compared to the two coprocessors Cp1 and Cp2, a significant performance increase of processor Pr (and thus substantially increased power consumption) might be necessary to complete the entire work interval before the deadline. As a result, these prior art systems might substantially increase power consumption without making an appreciable improvement in the ability of the system to meet the deadlines. However, by expanding the functionality of CLPC 300 to directly monitor and control and/or influence performance of each of the different processing units of the system (e.g., processor Pr and coprocessors Cp1 and Cp2), these disadvantages may be avoided.

Figure 15B:
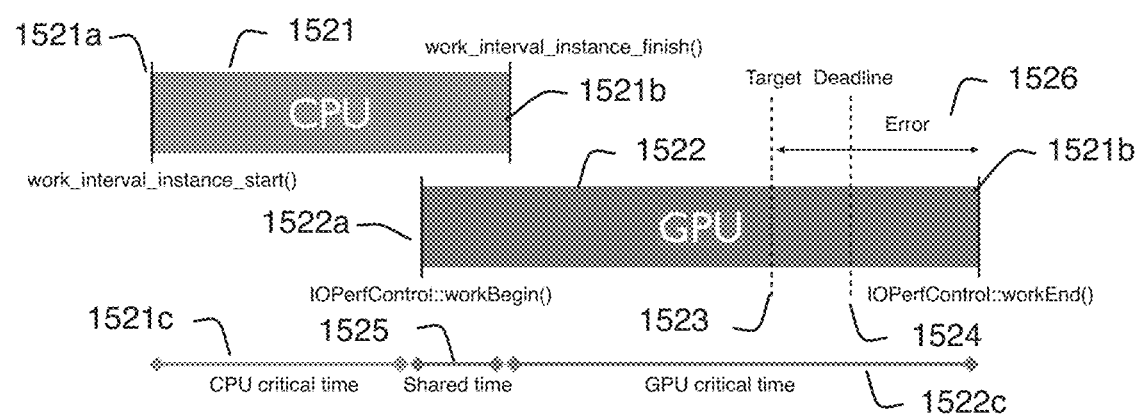
FIG. 15B illustrates an exemplary workload for a multiprocessor system depicting critical time for various processing elements.

An alternative way of illustrating the workload and associated processor performance issues is illustrated in FIG. 15B. FIG. 15B illustrates the CPU portion 1521 of a workload and the GPU portion 1522 of the same workload. The workload has a completion deadline 1524, which may be a time at which the processing must be completed to avoid undesirable effects (such as playback skips when decoding audio and/or video information). To ensure completion deadlines are met, there may be a completion target 1523 provided, which is slightly in advance of the deadline. The time difference between actual completion of the workload (1521b, as discussed below) and the target is the error 1526.

CPU portion 1521 of the workload begins at time 1521a and ends at time 1521b. GPU portion 1522 of the workload begins at time 1522a and ends at time 1522b. The beginning and end times of each processing agent portion may be delivered to the CLPC using the techniques described above. From these start and end times, the CLPC may determine the CPU critical time 1521c (i.e., the time during which only the CPU is working on the workload/thread group) and the GPU critical time 1522c (i.e., the time during which only the GPU is working on the workload/thread group). Critical utilization is discussed in greater detail below. A shared time 1525 is the time period when neither processing element is the critical processing element. Although FIG. 15 illustrates an arrangement with two processing elements (i.e., a CPU and a GPU) and a single workload/thread group, it will be appreciated that the same principles may be extended to a multiplicity of processing elements, including multiple processor cores of a given type, as well as multiple thread groups.

Turning back to FIG. 3, and with continued reference to FIG. 15B, CLPC 300 may ascertain the start and end times for each work interval on the CPU (e.g., 1501, 1505, and 1509) using the input/output performance API calls discussed above and in the cross-referenced co-pending applications. Additionally, GPU driver 2220 and neural engine driver 2225 may communicate with I/O service 2210 to execute their own input output performance calls when a work instance starts or finishes on their respective processors. This information may then be used by the operating system 120 (or by CLPC 300) to ascertain the total utilization time of each agent in the multiprocessor system. Knowing the total utilization time of each agent (e.g., CPU, GPU, neural engine, etc.) provides some insight into how the total system performance may be improved to meet the deadline. For example, if it is known that the work interval spends most of its time on one of the coprocessors, then CLPC may increase the performance of that coprocessor, e.g., by increasing its frequency/voltage to gain higher performance. An example of this process is illustrated in FIG. 16A.

Figure 16A:
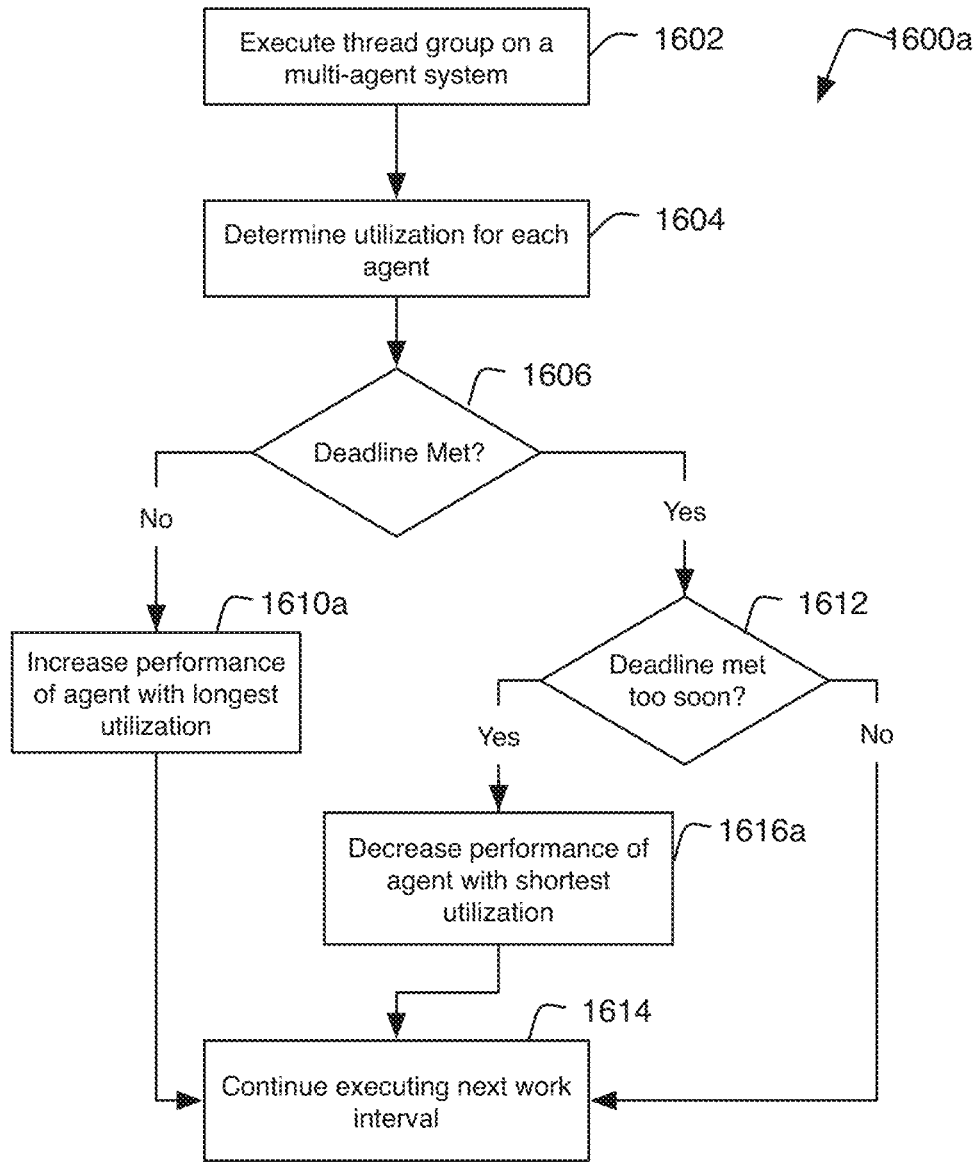
FIGS. 16A-16B illustrate methods for adjusting the performance of various agents in a multiprocessor system based on utilization.

FIG. 16A illustrates a method 1600a that may be performed by CLPC 300, operating in conjunction with operating system 120 (e.g., I/O service 2210 and various agent drivers 2220, 2225, and 2227 illustrated in FIG. 3) for adjusting the performance of various agents in a multiprocessor system. The method begins with process 1602, which includes executing a work interval on the multi-agent system. In process 1604, the execution time for each agent to complete the work interval may be determined. It is then determined whether the deadline for the work interval was met (1606). If not, then, in process 1610a, the performance of the agent with the longest execution time may be increased. Longest execution time may be measured either by the total execution time for each agent or may be measured as a fraction of each agent's run time as a total of the total work interval execution time. The performance increase applied in process 1610a may be a discrete step increase along a ladder of fixed performance states, or may be a proportional, integral, or proportional-integral controller depending on the particular implementation. In other embodiments, the performance increase may be determined by a scalability model, as described in greater detail below with respect to FIG. 19. In any case, the system continues with process 1614 to execute the next work interval.

Alternatively, if the result of test 1606 is that the deadline was met, it may be determined whether the deadline was met too soon. For example, there may be a headroom threshold associated with the deadline. This headroom threshold may be an absolute amount of time or may be a percentage of the job length. If the workload completes within the headroom threshold (the no branch), then the deadline was not met too soon, no adjustment is necessary, and the system may execute the next work interval in process 1614 without further performance adjustment. Alternatively, if the workload completes outside the headroom threshold (the yes branch), then the deadline was met too soon. In this case, process 1616a can decrease the performance of the agent with the shortest execution time (thereby lengthening the total computation time). The performance decrease applied in process 1616a may be a discrete step decrease along a ladder of fixed performance states, or may be a proportional, integral, or proportional-integral controller depending on the particular implementation. In other embodiments, the performance decrease may be determined by a scalability model, as described in greater detail below with respect to FIG. 19. The system may then continue executing the next work interval with the decreased performance (process 1614).

Figure 16B:
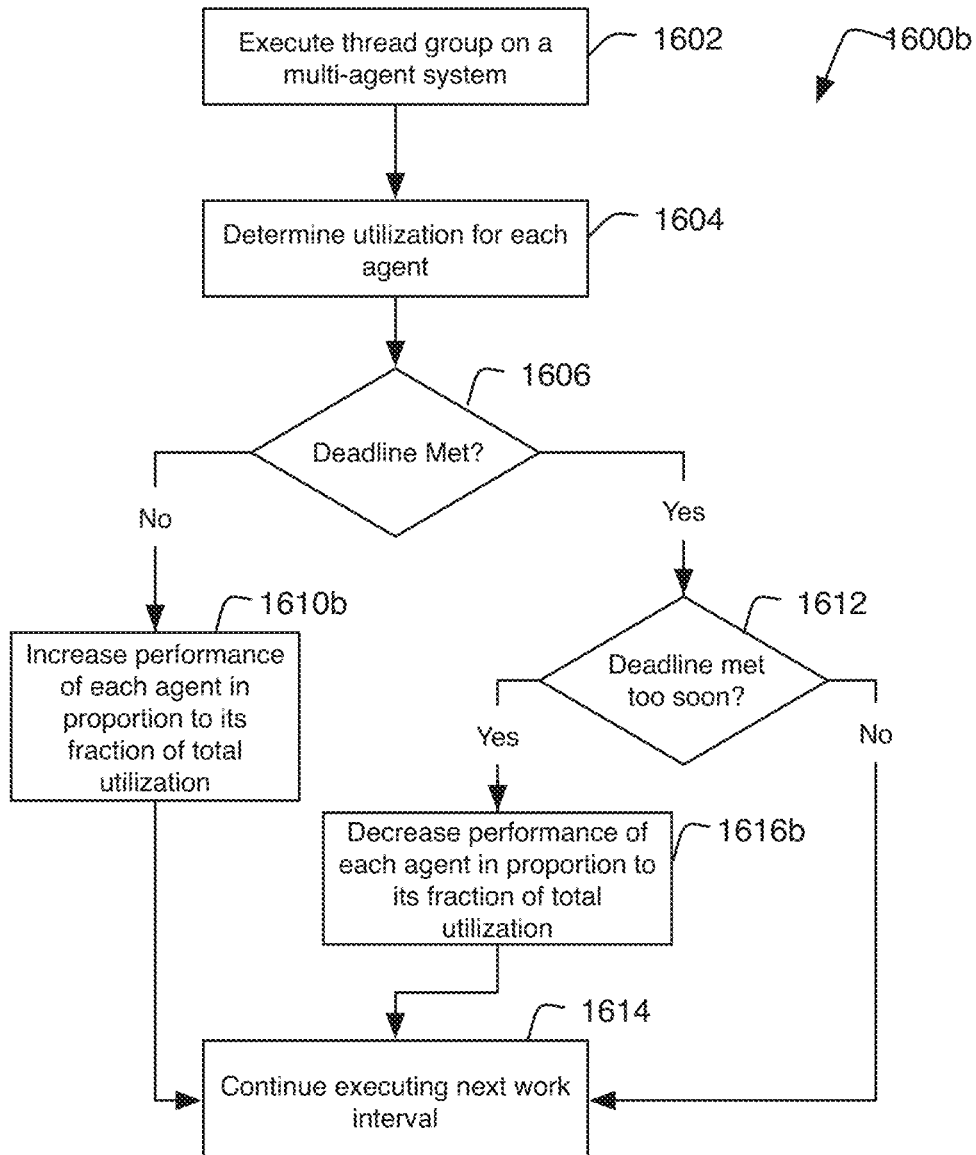

While the foregoing algorithm adjusts only a single processing agent, the same principles may be used to adjust each processing agent according to the algorithm depicted in FIG. 16B. As above, the method begins with process 1602, which includes executing a work interval on the multi-agent system. In process 1604, the execution time for each agent to complete the work interval may be determined. It is then determined whether the deadline for the work interval was met (1606). If not, then, in process 1610b, the performance of each agent is increased in proportion to its fraction of the total execution time. In other words, an agent that was being utilized for 40% of the total execution time of a work interval will have 40% of the increase it would otherwise receive if it were the sole element being adjusted according to the technique described above with respect to FIG. 16A. The performance increase applied in process 1610b may be a discrete step increase along a ladder of fixed performance states, or may be a proportional, integral, or proportional-integral controller depending on the particular implementation. In other embodiments, the performance increase may be determined by a scalability model, as described in greater detail below with respect to FIG. 19. In any case, the system continues with process 1614 to execute the next work interval.

Alternatively, if the result of test 1606 is that the deadline was met, it may be determined whether the deadline was met too soon. For example, there may be a headroom threshold associated with the deadline. This headroom threshold may be an absolute amount of time or may be a percentage of the job length. If the workload completes within the headroom threshold (the no branch), then the deadline was not met too soon, no adjustment is necessary, and the system may execute the next work interval in process 1614 without further performance adjustment. Alternatively, if the workload completes outside the headroom threshold (the yes branch), then the deadline was met too soon. In this case, process 1616b can decrease the performance of each agent in proportion to its share of the total execution time (thereby lengthening the total computation time). The performance decrease applied in process 1616b may be a discrete step decrease along a ladder of fixed performance states, or may be a proportional, integral, or proportional-integral controller depending on the particular implementation. In other embodiments, the performance decrease may be determined by a scalability model, as described in greater detail below with respect to FIG. 19. The system may then continue executing the next work interval with the decreased performance (process 1614).

The technique described above may provide some performance improvement over prior art systems, in that the performance of each agent may be individually altered. However, the system may be further optimized by considering more than the total run time of each agent. More specifically, it may be desirable to determine the critical run time of each agent (i.e., the time during which only that agent is working on the thread group) and the power efficiency of each agent.

Critical Utilization of Each Agent

For any less than perfectly pipelined workload spanning multiple agents (i.e., different processors or coprocessors), there will be at least one critical agent for at least a portion of the execution time of a work interval. A critical agent is an agent that is processing a work interval while none of the other agents is working on that interval. In many workloads, each agent will be a critical agent for at least a portion of the work interval. In a perfectly serialized workload, each agent is always a critical agent. Critical run time for an agent may be defined as the run time of an agent during which none of the other agents are processing the work interval. Critical utilization for an agent is the total of the critical run time for the agent during the work interval. Reducing the critical utilization of one or more agents can be a more optimal way in which to improve deadline performance.

More specifically, reducing the critical utilization of an agent provides a directly corresponding reduction in the total run time of the work interval. In other words, reducing the critical utilization of an agent by a certain amount of time t will result in reducing the total run time of the work interval by the same time t. This is because the remaining agents will spend t less time waiting on the critical agent but will still be able to complete their portion of the workload in the same time it would otherwise have taken. Conversely, reducing non-critical utilization of an agent by an amount of time t may result in a reduction in the total run time by less than t. In some cases, there may be no reduction at all in the total run time. It will be appreciated that reducing non-critical utilization of an agent may result in an intermediate result being ready before a subsequent agent is ready for it, thus providing no benefit in reducing the total run time.

Thus, the deadline driven control algorithm depicted in FIGS. 16A and 16B may be enhanced by identifying the agent having the highest critical utilization and increasing the performance of that agent if necessary to meet a deadline. Critical utilization of an agent may be determined by CLPC 300. More specifically, CLPC 300 may have a run counter for each agent (e.g., CPU, GPU, neural engine, etc.) This run counter will tell CLPC 300 how many and threads are running on the respective agent and to which thread groups these threads belong. From this information, CLPC 300 can tell when an agent is the critical agent. For example, for a given thread group, when the run count for the CPU is non-zero, and the thread counts for the other agents are zero, the CPU can be determined to be the critical agent. As described above with respect to FIGS. 15, 16A and 16B, CLPC 300 may also know the start and stop times for each work instance on each respective agent. By correlating this data, CLPC 300 may determine critical run time for each agent. By summing the critical run times for each agent over execution of the entire work interval and dividing by the total run time for the work interval, critical utilization for each agent may be determined. Then, if performance of the system is insufficient to meet a deadline, performance of the agent having the highest critical utilization may be increased as described below with respect to FIG. 17A. Alternatively, if the performance of the system is so high that deadlines are being met too soon (resulting in power inefficiency), the performance of the agent with the lowest critical utilization may be decreased as described below with respect to FIG. 17A.

Figure 17A:
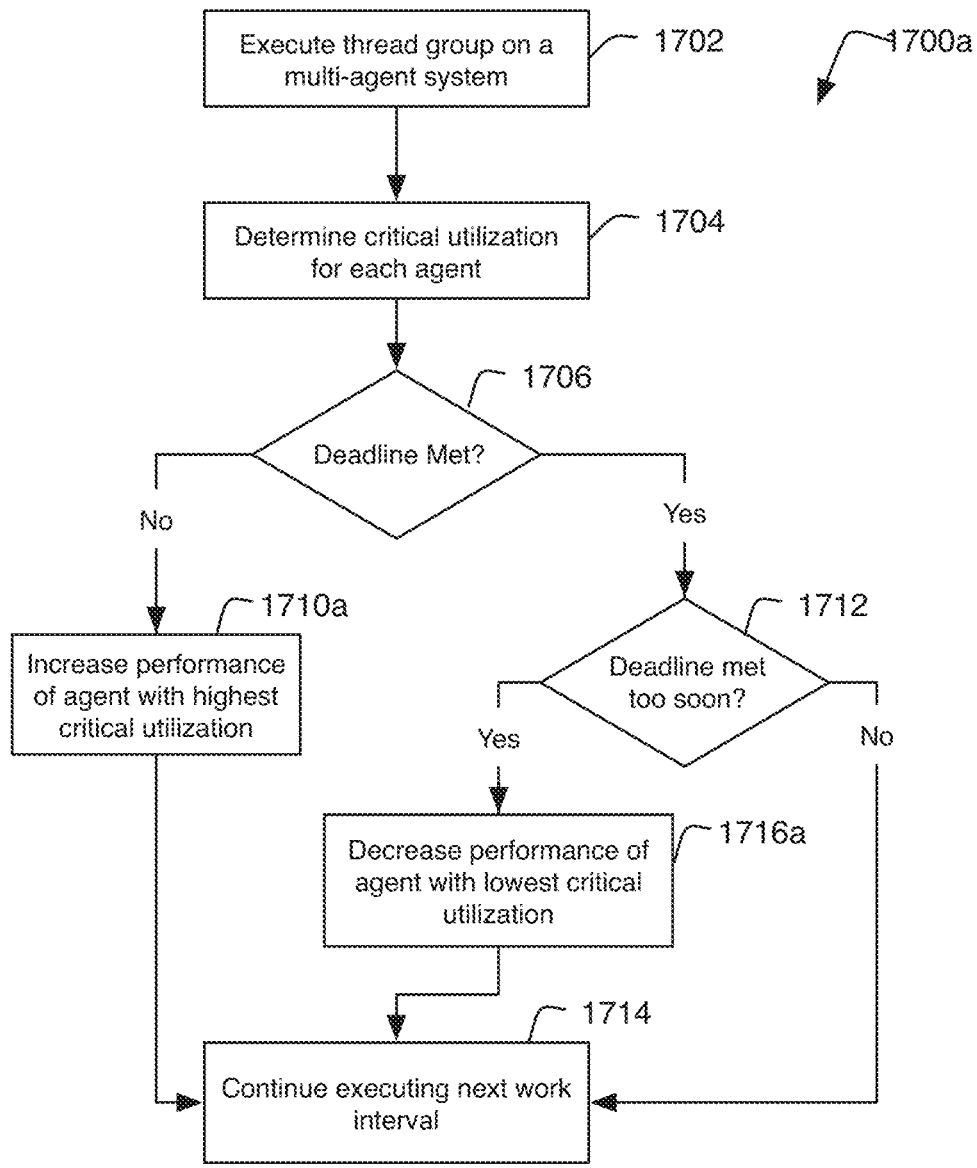
FIGS. 17A-17B illustrate methods for adjusting the performance of various agents in a multiprocessor system based on critical utilization.

FIG. 17A illustrates a method 1700A that may be performed by CLPC 300, operating in conjunction with operating system 120 (e.g., I/O service 2210 and various agent drivers 2220, 2225, and 2227 illustrated in FIG. 3) for adjusting the performance of various agents in a multiprocessor system. The method begins with process 1702, which includes executing a work interval on the multi-agent system. In process 1704, the critical utilization for each agent may be determined as described above. It is then determined whether the deadline for the work interval was met (1706). If not, then, in process 1710a, the performance of the agent with the highest critical utilization may be increased. This effectively reduces the amount of time that the other agents must spend waiting on the most critical agent. The performance increase applied in process 1710a may be a discrete step increase along a ladder of fixed performance states, or may be a proportional, integral, or proportional-integral controller depending on the particular implementation. In other embodiments, the performance increase may be determined by a scalability model, as described in greater detail below with respect to FIG. 19. In any case, the system continues with process 1714 to execute the next work interval.

Alternatively, if the result of test 1706 is that the deadline was met, it may be determined whether the deadline was met too soon. For example, there may be a headroom threshold associated with the deadline. This headroom threshold may be an absolute amount of time or may be a percentage of the job length. If the workload completes within the headroom threshold (the no branch), then the deadline was not met too soon, no adjustment is necessary, and the system may execute the next work interval in process 1714 without further performance adjustment. Alternatively, if the workload completes outside the headroom threshold (the yes branch), then the deadline was met too soon. In this case, process 1716a can decrease the performance of the agent with the lowest critical utilization, thus increasing the amount of time that the other agents will spend waiting on this element. The performance decrease applied in process 1716a may be a discrete step decrease along a ladder of fixed performance states, or may be a proportional, integral, or proportional-integral controller depending on the particular implementation. In other embodiments, the performance decrease may be determined by a scalability model, as described in greater detail below with respect to FIG. 19. The system may then continue executing the next work interval with the decreased performance (process 1714).

Figure 17B:
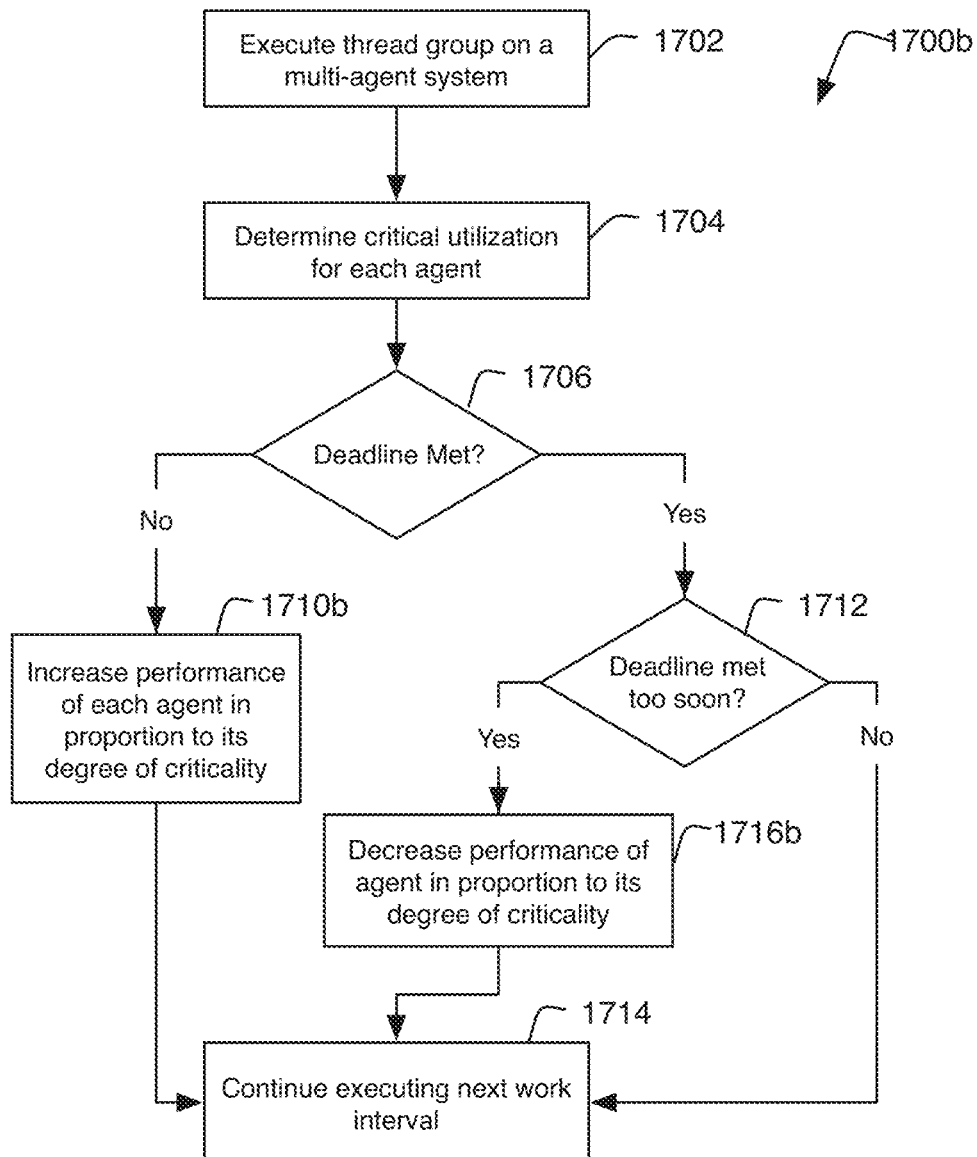

While the foregoing algorithm adjusts only a single, most critical processing agent, the same principles may be used to adjust each processing agent according to its degree of criticality using an algorithm like that depicted in FIG. 17B. FIG. 17B illustrates a method 1700b which may be performed by CLPC 300, operating in conjunction with operating system 120 (e.g., I/O service 2210 and various agent drivers 2220, 2225, and 2227 illustrated in FIG. 3) for adjusting the performance of various agents in a multiprocessor system. The method begins with process 1702, which includes executing a work interval on the multi-agent system. In process 1704, the critical utilization for each agent may be determined as described above. It is then determined whether the deadline for the work interval was met (1706). If not, then, in process 1710b, the performance of each agent is increased in proportion to its degree of criticality. Degree of criticality may be determined by a ratio of the critical utilization of a given agent to the total critical utilization for all agents. Thus, if a given work interval has a total critical utilization of 100 ms (meaning that for 100 ms of the work interval an agent was critical), and a given agent contributed 40 ms to the total, that agent would have its performance increased by 40% of the performance increase it would receive if it were the only element being adjusted. This effectively reduces the amount of time that each agent is acting as the critical agent. The performance increase applied in process 1710b may be a discrete step increase along a ladder of fixed performance states, or may be a proportional, integral, or proportional-integral controller depending on the particular implementation. In other embodiments, the performance increase may be determined by a scalability model, as described in greater detail below with respect to FIG. 19. In any case, the system continues with process 1714 to execute the next work interval.

Alternatively, if the result of test 1706 is that the deadline was met, it may be determined whether the deadline was met too soon. For example, there may be a headroom threshold associated with the deadline. This headroom threshold may be an absolute amount of time or may be a percentage of the job length. If the workload completes within the headroom threshold (the no branch), then the deadline was not met too soon, no adjustment is necessary, and the system may execute the next work interval in process 1714 without further performance adjustment. Alternatively, if the workload completes outside the headroom threshold (the yes branch), then the deadline was met too soon. In this case, process 1716b can decrease the performance of each agent in proportion to its degree of criticality (determined as described above). The performance decrease applied in process 1716*b* may be a discrete step decrease along a ladder of fixed performance states, or may be a proportional, integral, or proportional-integral controller depending on the particular implementation. In other embodiments, the performance decrease may be determined by a scalability model, as described in greater detail below with respect to FIG. 19. The system may then continue executing the next work interval with the decreased performance (process 1714).

Although the foregoing description assumes a single critical agent, it will be appreciated that the criticality analysis may be conducted on a pair-wise or other tuple-wise basis so as to ascertain criticality of more than one agent with respect to another agent or group of agents. In this case, the performance of the critical group of agents (rather than just a single agent) may be adjusted as described above. The algorithm described above may be used to increase performance of a particular agent in a multiprocessor system in a way that most significantly improves the total performance of the system, e.g., how well it is able to meet a deadline. However, in some cases a critical utilization-based approach may meet the deadlines in a way that is less power efficient than some other performance adjustment that would also meet the deadlines.

Power Efficiency of Each Agent

In modern computing systems, power consumption of the processing units may be of high importance. This may be especially true in the case of mobile systems that are limited to a finite amount of battery power. Thus, when increased performance is desired, power considerations may be employed to achieve the required level of performance at minimal power cost.

Many modern processor systems include one or more digital power estimators. For example, an analog power measurement circuit or a digital power estimator may be included for each agent of a multi-agent processing system. Thus, in the exemplary embodiment of FIG. 3, each of processor complex 111, GPU 2230, neural engine 2235, and additional processors 2237 may include their own power estimator. In some embodiments, digital power estimators may be implemented as a free-running, ever-increasing counter that continuously increments as the agent is running. When the agent is running in a higher performance state, the counter may be updated with a greater increment and/or more frequently. When the agent is running in a lower performance state, the counter may be updated with a smaller increment and/or less frequently. As a result, subtracting a digital power estimator sample from the beginning of a work instance from a digital power estimator sample from the end of a work instance gives an indication of the energy consumed by that agent in completing the work instance. Dividing the energy consumed by the length of time between beginning and end of the work instance give an estimate of the power consumption of the agent. Thus, according to the principles described above, power consumed by each agent may be accounted for in making the performance adjustments using either the execution time/ utilization algorithms described with respect to FIGS. 16A and 16B or the critical utilization algorithms described with respect to FIGS. 17A and 17B.

One way to incorporate power efficiency into any of these algorithms is by making a cost benefit comparison. The cost of a particular adjustment to a particular agent may be considered to be the associated increase in power consumption. The benefit of a particular adjustment to a particular agent may be considered as the associated decrease in execution time. This cost benefit ratio gives what may be considered an efficiency for each agent.

Figure 18A:
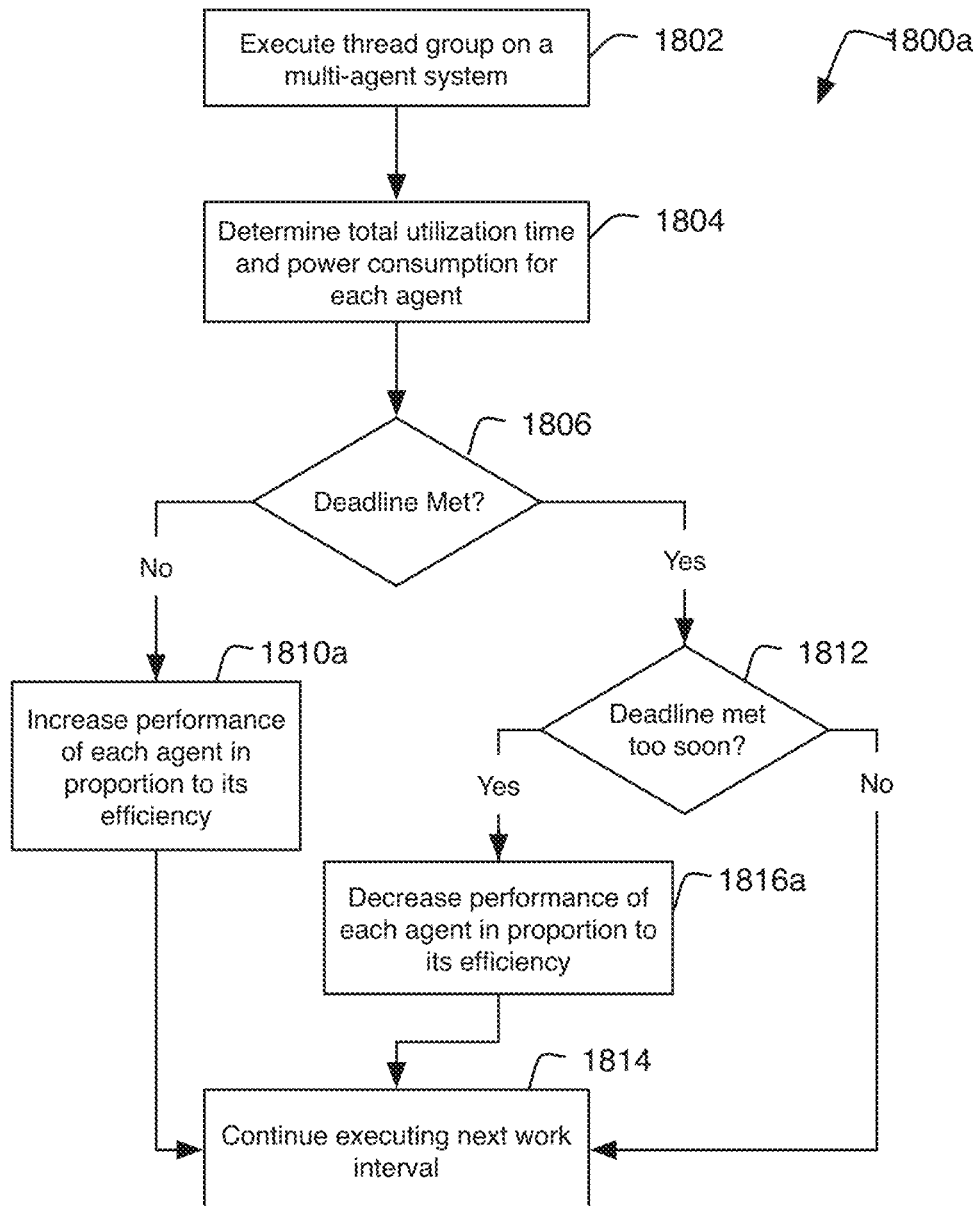
FIGS. 18A-18B illustrate methods for adjusting the performance of various agents in a multiprocessor system based on efficiency.

FIG. 18A illustrates a method 1800*a* incorporating power efficiency into a utilization-based performance control method similar to that illustrated in FIGS. 16A and 16B. Method 180*a* may be performed by CLPC 300, operating in conjunction with operating system 120 (e.g., I/O service 2210 and various agent drivers 2220, 2225, and 2227 illustrated in FIG. 3) for adjusting the performance of various agents in a multiprocessor system. The method begins with process 1802, which includes executing a work interval on the multi-agent system. In process 1804, the execution time for each agent to complete the work interval may be determined as well as the power consumption for each agent. It is then determined whether the deadline for the work interval was met (1806). If not, then, in process 1810*a*, the performance of each agent may be increased in proportion to its efficiency. It will be appreciated that as the execution time of a given agent decreases, its efficiency will increase, and as the power consumed by the agent decreases, its efficiency will also increase. Furthermore, power consumed may be estimated over any number of past work intervals.

As above, the performance increase applied in process 1810*a* may be a discrete step increase along a ladder of fixed performance states, or may be a proportional, integral, or proportional-integral controller depending on the particular implementation. In other embodiments, the performance increase may be determined by a scalability model, as described in greater detail below with respect to FIG. 19. In any case, the system continues with process 1814 to execute the next work interval.

Alternatively, if the result of test 1806 is that the deadline was met, it may be determined whether the deadline was met too soon. For example, there may be a headroom threshold associated with the deadline. This headroom threshold may be an absolute amount of time or may be a percentage of the job length. If the workload completes within the headroom threshold (the no branch), then the deadline was not met too soon, no adjustment is necessary, and the system may execute the next work interval in process 1814 without further performance adjustment. Alternatively, if the workload completes outside the headroom threshold (the yes branch), then the deadline was met too soon. In this case, process 1816*a* can decrease the performance of each agent in proportion to its efficiency. The performance decrease applied in process 1816*a* may be a discrete step decrease along a ladder of fixed performance states, or may be a proportional, integral, or proportional-integral controller depending on the particular implementation. In other embodiments, the performance decrease may be determined by a scalability model, as described in greater detail below with respect to FIG. 19. The system may then continue executing the next work interval with the decreased performance (process 1814).

Figure 18B:
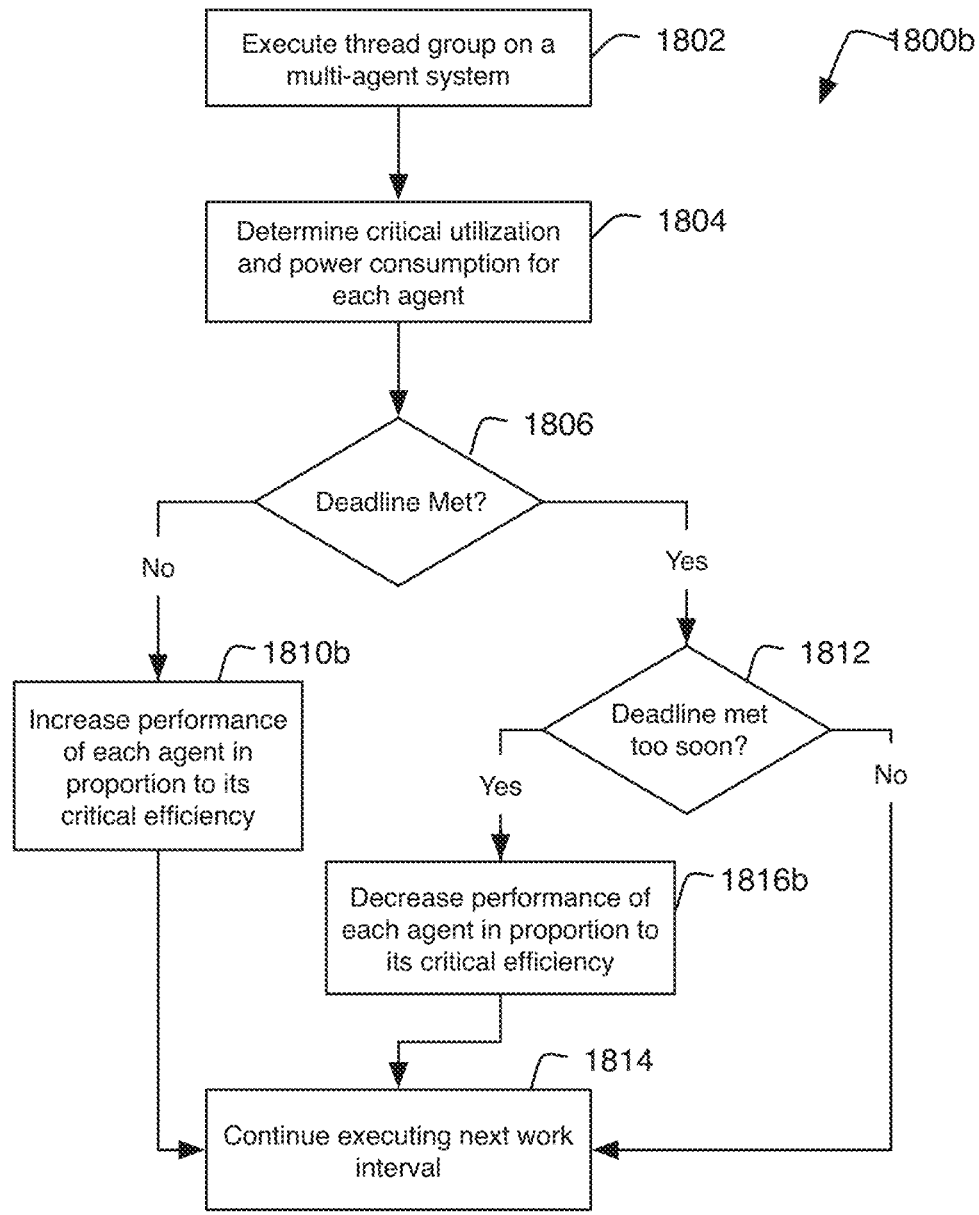

FIG. 18B illustrates a method 1800*b* incorporating power efficiency into a criticality-based performance control method similar to that illustrated in FIGS. 17A and 17B. Method 180*b* may be performed by CLPC 300, operating in conjunction with operating system 120 (e.g., I/O service 2210 and various agent drivers 2220, 2225, and 2227 illustrated in FIG. 3) for adjusting the performance of various agents in a multiprocessor system. The method begins with process 1802, which includes executing a work interval on the multi-agent system. In process 1804, the critical utilization for each agent to complete the work interval may be determined as well as the power consumption for each agent. It is then determined whether the deadline for the work interval was met (1806). If not, then, in process 1810*b*, the performance of each agent may be increased in proportion to its efficiency. It will be appreciated that as the critical time of a given agent decreases, its efficiency will increase, and as the power consumed by the agent decreases, its efficiency will also increase. Furthermore, power consumed may be estimated over any number of past work intervals.

As above, the performance increase applied in process 1810*b* may be a discrete step increase along a ladder of fixed performance states, or may be a proportional, integral, or proportional-integral controller depending on the particular implementation. In other embodiments, the performance increase may be determined by a scalability model, as described in greater detail below with respect to FIG. 19. In any case, the system continues with process 1814 to execute the next work interval.

Alternatively, if the result of test 1806 is that the deadline was met, it may be determined whether the deadline was met too soon. For example, there may be a headroom threshold associated with the deadline. This headroom threshold may be an absolute amount of time or may be a percentage of the job length. If the workload completes within the headroom threshold (the no branch), then the deadline was not met too soon, no adjustment is necessary, and the system may execute the next work interval in process 1814 without further performance adjustment. Alternatively, if the workload completes outside the headroom threshold (the yes branch), then the deadline was met too soon. In this case, process 1816*b* can decrease the performance of each agent in proportion to its efficiency (thereby lengthening the total computation time). It will be appreciated that as the critical time of a given agent decreases, its efficiency will increase, and as the power consumed by the agent decreases, its efficiency will also increase. Furthermore, power consumed may be estimated over any number of past work intervals. The performance decrease applied in process 1816*b* may be a discrete step decrease along a ladder of fixed performance states, or may be a proportional, integral, or proportional-integral controller depending on the particular implementation. In other embodiments, the performance decrease may be determined by a scalability model, as described in greater detail below with respect to FIG. 19. The system may then continue executing the next work interval with the decreased performance (process 1814).

In the foregoing examples, power cost for each agent is determined as a backward-looking estimation. This backward-looking estimation may be advantageous in that it may be easier to ascertain past power consumption over some known prior period of time than to estimate power on a forward-looking basis. Nonetheless, any of the above-described algorithms could also be used with forward-looking power estimates. In either case, the objective is the same, which is to increase performance in a way that meets performance deadlines at a lowest energy cost.

In some embodiments, a forward looking power estimation may be made by determining or estimating a present frequency and voltage (i.e., power consumption) of an agent. Additionally, a measured or estimated activity factor of the workload may be determined or estimated. For example, the activity factor may be a fraction the workload versus the total work being done by the agent. Additionally, it may be useful to consider the present temperature of the agent. Then, a desired frequency and voltage (i.e., power consumption) of the agent may be estimated, along with an estimate of the new activity factor for the desired frequency voltage state. Then, assuming that the desired power state would remain within the thermal constraints of the agent, it may be determined whether the increased power "cost" is worth the increased performance.

Scalability Model Control

As noted above, for various deadline driven control schemes, the performance state of a processing element, such as a CPU, a GPU, a neural engine, etc., may be determined by a scalability model. In general, the operating principle of a scalability model is based on the assumption that processing element frequency is inversely proportional processing element run time. Thus, doubling the frequency of a processing element will half the run time of a task on that element, and, conversely, halving the frequency of a processing element will double the run time of a task on that element. It will be appreciated that this assumption holds only for a task that is 100% bound to the processing element in question and a workload that is 100% scalable. A load that is less than 100% bound to the processing element is one that has factors other than processing element performance limiting its performance. For example, I/O timing limitations may result in a situation where a task is less than 100% bound to the processing element performance or is less than 100% scalable. In any case, a controller employing a scalability model may increase a DVFS state of the processor in proportion to the amount of time by which a deadline associated with a thread group is missed or met too soon.

Figure 19:
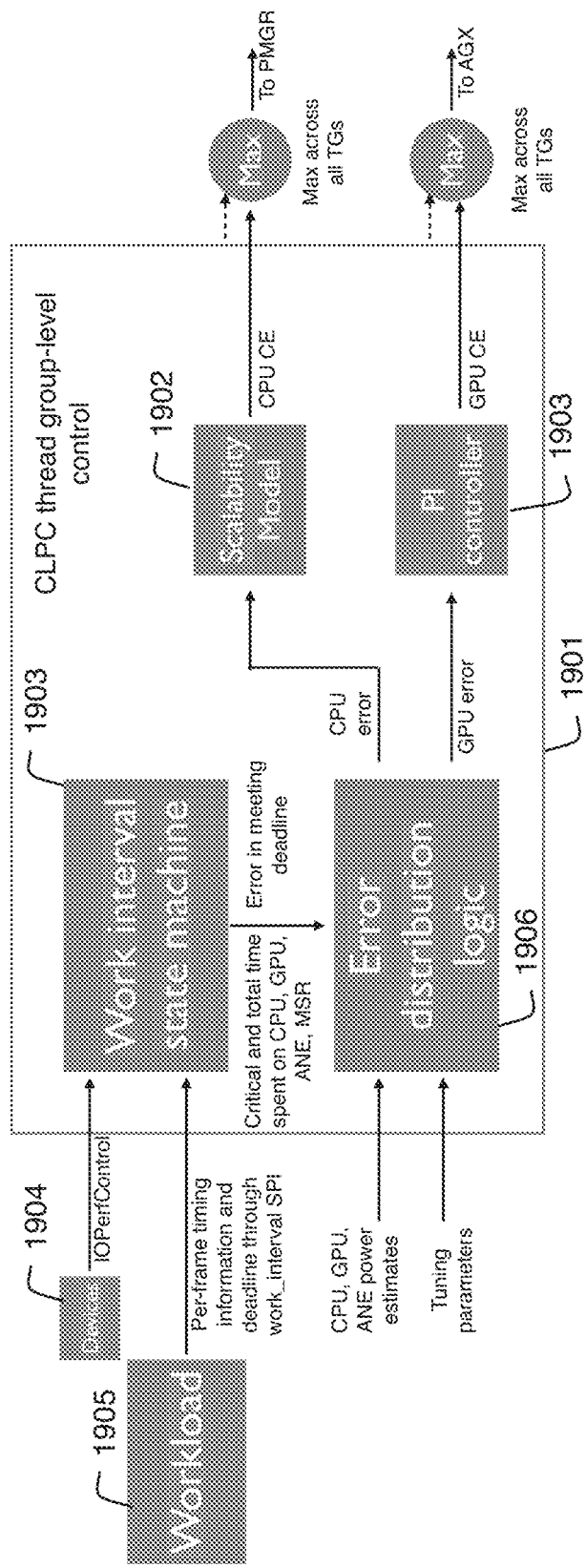
FIG. 19 illustrates an example scalability model based control system.

An example scalability model based control system is illustrated in FIG. 19. Other variations and embodiments are also possible. Closed loop performance controller 1901 implements a scalability model 1902 to determine a CPU control effort parameter (CPU-CE), while using a proportional-integral (PI) controller 1903 to determine a GPU control effort parameter (GPU-CE). In some embodiments a scalability model could be used to set the GPU control effort, or to set control efforts associated with other processing elements, such as neural engines or other specialized processors as discussed above. At a high level, CLPC 1901 operates similarly to the CLPCs described above. More specifically, a work interval state machine 1904 may receive inputs including I/O performance control inputs related to other components 1904 of the system (i.e., meta data relating to the timing and control of data inputs and outputs for the processor complex). Additionally, work interval state machine 1903 receives inputs relating to workload(s) 1905 that provide information about the required performance, timing, deadlines, etc. for each thread group. This data may be delivered to CLPC 1901 and work interval state machine 1903 via the APIs discussed above.

From the received data, work interval state machine 1903 can determine, for each thread group, critical time and total time spent by each processing agent on a given thread group. For example, work interval state machine 1903 may determine, for each thread group, critical and total time on a CPU, a GPU, a neural engine, and/or other processing elements. Additionally, work interval state machine 1903 can determine an error in meeting a deadline for each thread group. All of this information, i.e., critical time and total time for each processing agent on a given thread group and error in meeting the thread group deadline, may be provided to error distribution logic 1906. Error distribution logic 1906 may operate according to various combinations of the principles discussed above with respect to FIGS. 16A-18B to allocate the error in meeting a deadline for a thread group among the processing agents associated with that thread group. Thus, error distribution logic 1906 may also receive inputs from outside CLPC 1901 that provide information relating to processing agent power estimates and tuning parameters (as discussed above).

Error Distribution Logic

Turning back to FIG. 15B, discussed above, provides context for an explanation of how error distribution logic may operate. As discussed above, the critical path may dictate how the various processing agents may have their performance adjusted, because reduction of critical execution time of a processing agent provides a 1:1 reduction in the total execution time of the thread group. In the foregoing examples, for example, those discussed with respect to FIGS. 17A, 17B, and 18B, isolated execution is used as a proxy for criticality. Isolated execution time is, by definition, critical execution time; however, there may be a portion of shared execution time 1525 that is also critical with respect to one of a plurality of processing agents operating during that time. Nonetheless, for purposes of the control techniques discussed herein, isolated execution time achieves the desired objectives without the added difficulty and complexity of determining a critical agent during a shared execution time.

In addition to criticality of a given processing agent, the degree of serialization of a workload, which may be determined as set forth above, may also inform performance control of the various processing agents in a system. For a more serialized workload, it may be preferable to adjust the performance of the processing agents based on their relative critical time. In other words, with a highly serialized load, for a missed deadline, the largest benefits may come from increasing performance of the processing agent with the longest critical time. Conversely, for a deadline met too far in advance, indicating unnecessary power expenditure, decreasing the performance of the processing agent with the shortest critical time may provide the greatest benefits. The techniques were as illustrated in and discussed with respect to FIG. 17A. Conversely, for a less serialized/more pipelined load, the greatest performance benefits may be achieved by proportionally adjusting the performance of each processing agent according to its fraction of the critical time as illustrated in and discussed with respect to FIG. 17B.

Finally, taking into account power efficiency, it may be desirable to avoid increasing the performance of processing agents that are already consuming too much power. Conversely, it may also be generally desirable to decrease the performance of processing agents consuming the most power, where possible.

Thus, with continued reference to FIG. 19, error distribution logic 1906 may take as inputs a start time of a workload associated with a thread group, a finish time of the workload associated with a thread group, a deadline for completing the workload thread group. Error distribution logic 1906 may also take as inputs, for each processing agent, a critical processing time, a total processing time, and a power consumption. These inputs may be processed as follows to determine appropriate control efforts for each processing agent. More specifically, a utilization measure for the processor complex as a whole may be given by:

$$\text{utilization} = \frac{T_{finish} - T_{start}}{T_{deadline} - T_{start}}$$

where utilization is the utilization measure for the processor complex, $T_{finish}$ is the finish time of processing on the processor complex, $T_{start}$ is the start time of processing on the processor complex, and $T_{deadline}$ is the deadline time. A utilization error for the processor complex as a whole may thus be given by:

error_util=utilization−target_utilization where error_util is the utilization error for the processor complex, utilization is the utilization measure for the processor complex, and target_utilization is the target utilization for the processor complex. The degree of serialization of the workload may thus be determined by $$DoS = \frac{\Sigma T_{critical_i}}{T_{finish} - T_{start}}$$

where DoS is the degree of serialization, $Tcritical_i$ is the critical time for each processing agent i, and $T_{finish}$ and $T_{start}$ are the finish and start times of the workload on the processor complex, respectively. An allocated error component for each processing agent can thus be given by:

error_util$_i$=(1−DoS+DoS·$\phi_i$)·error_util where error_util$_i$ is the allocated error for a given processing agent i, DoS is the degree of serialization, $\phi_i$ is an efficiency measure computed as described below.

Efficiency measure $\phi_i$ may be computed by two different formulas, one being the reciprocal of the other. For cases where the utilization error is positive (i.e., a deadline has been issed), $\phi_i$ may be given by:

$$\phi_i = \frac{\frac{Tcrit_i}{P_i}}{\Sigma \frac{Tcrit_i}{P_i}}$$

where $\phi_i$ is a measure of the efficiency of an agent i; $Tcrit_i$ is the critical time of agent i on the work interval; $\Sigma Tc_i$ is the total critical utilization of the work interval; and $P_i$ the power consumed by the agent. For cases where the utilization error is negative (i.e., a deadline has been met too early), $\phi_i$ may be given by:

$$\phi_i = \frac{\frac{P_i}{Tcrit_i}}{\Sigma \frac{P_i}{Tcrit_i}}$$

where $\phi_i$ is a measure of the efficiency of an agent i; $Tcrit_i$ is the critical time of agent i on the work interval; $\Sigma Tc_i$ is the total critical utilization of the work interval; and $P_i$ the power consumed by the agent.

Returning to FIG. 19, the allocated error for the CPU (which may be computed in accordance with the formulas above) may be input into scalability model 1902. As described above, scalability model may thus increase or decrease the CPU control effort contribution (CPU_CE) in proportion to the allocated CPU error. As these parameters are computed on a per thread group basis, the maximum computed control effort contribution, corresponding to the thread group requiring the most computational resources, may be used to set the performance state of the CPU. Additionally, the allocated error for the GPU (which may be computed in accordance with the formulas above) may be input into PI controller 1903, which may thus increase or decrease the GPU control effort contribution (GPU_CE) associated with the thread group in response to the allocated GPU error. Again, as these parameters are computed on a per thread group basis, the maximum computed control effort contribution, corresponding to the thread group requiring the most computational resources, may be used to set the performance state of the GPU.

Error Distribution Special Cases

The foregoing mathematical treatment of the error distribution logic captures a variety of nominal operating conditions for the processor complex. However, there may be certain edge cases in which it is necessary to modify the error distribution logic to obtain suitable performance. For example, in the case where the performance of an agent is already at its maximum, but a deadline is not being met, it is not possible to further increase the performance of that agent to take its allocated share of the utilization error. Similarly, in the case where the performance of an agent is already at its minimum, but deadlines are still being met too soon, implying inefficient power use, it is not possible to further decrease the performance of that agent to take its allocated share of the utilization error. Thus, in such cases, it might be preferable to provide a mechanism that (1) determines whether the requested performance change for an agent is possible given the current performance state of the agent and (2) reallocate that agent's proportional share of the error to other agents that still have adjustment headroom.

Another edge case exists at the beginning stage of a multi-agent workload. In one example, a CPU may have just started executing, and will thus have a non-zero power consumption value. However, a GPU may not be running yet, and will thus have a zero power consumption value. As a result, the algorithm described above may disproportionately allocate increased performance to the GPU. However, because GPUs are, in general, less power efficient than CPUs, this may result in inefficiency. Thus, it may be desirable to provide a bias factor that preferentially allocates error to a more power efficient component, or less preferentially allocates error to a less power efficient component. Additionally, one could ensure that the error distribution logic always sees a minimum floor for the less power efficient component, to avoid over allocation of error to the less power efficient component.

Any of the foregoing deadline driven control algorithms may be enhanced in a variety of other ways. For example, heuristics could be incorporated into the various algorithms. These heuristics could be selected and or tuned to achieve a desired result in a particular embodiment. For example, one such heuristic could be speeding up one processing element (e.g., a processor or CPU) the before speeding up coprocessors (e.g., a GPU or neural engine). The reverse might alternatively be desirable in some applications. Additionally or alternatively, the performance adjustment of a particular agent might be biased so that that element receives more or less adjustment, depending on how effective performance increases are with respect to that agent or with respect to a particular workload.

Some embodiments described herein can include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A method of controlling performance of one or more processors or coprocessors of an asymmetric multiprocessor system, the method comprising:
    executing a thread group on a processor and a coprocessor of the asymmetric multiprocessor system, wherein the thread group has a first control effort parameter corresponding to the processor and a second control effort parameter corresponding to the coprocessor; and at least one of:
    performing a hysteretic adjustment of the first control effort parameter to slow a transition of the processor to a low power state while a workload associated with the thread group is executing on the coprocessor; or
    performing a hysteretic adjustment of the second control effort parameter to slow a transition of the coprocessor to a low power state while the workload associated with the thread group is executing on the processor.

2. The method of claim 1 wherein the hysteretic adjustment of at least one of the first control effort parameter and the second control effort parameter includes delaying a time between the workload being submitted to the coprocessor and decreasing the first control effort parameter.

3. The method of claim 1 wherein the hysteretic adjustment includes decreasing a rate at which the first control effort parameter decreases.

4. The method of claim 1 wherein the processor is selected from the group consisting of a central processing unit, a graphics processing unit, a general purpose graphics processing unit, a neural engine, an image signal processor, and a scaling and rotating engine.

5. The method of claim 1 wherein the coprocessor is selected from the group consisting of a central processing unit, a graphics processing unit, a general purpose graphics processing unit, a neural engine, an image signal processor, and a scaling and rotating engine.

6. The method of claim 1 wherein the first and second control effort parameters respectively affect at least one of an allocated subset of cores or execution units and a dynamic voltage and frequency state of the processor or the coprocessor.

7. An asymmetric multiprocessor system comprising:
    a processor complex comprising one or more processors;
    one or more coprocessors;
    a closed loop performance controller configured to control performance of the one or more processors and the one or more coprocessors; and
    an operating system executing on the processor complex, the operating system comprising an input/output service interactive with the closed loop performance controller and one or more drivers corresponding to the one or more coprocessors;

wherein the closed loop performance controller is configured to cooperate with the operating system, the processor complex, and the one or more coprocessors to:

execute a thread group on a processor and a coprocessor of the asymmetric multiprocessor system, wherein the thread group has a first control effort parameter corresponding to the processor and a second control effort parameter corresponding to the coprocessor; and at least one of:

perform a hysteretic adjustment of the first control effort parameter to slow a transition of the processor to a low power state while a workload associated with the thread group is executing on the coprocessor; or perform a hysteretic adjustment of the second control effort parameter to slow a transition of the coprocessor to a low power state while a workload associated with the thread group is executing on the processor.

8. The asymmetric multiprocessor system of claim 7 wherein the hysteretic adjustment of at least one of the first control effort parameter and the second control effort parameter includes delaying a time between the workload being submitted to the coprocessor and decreasing the first control effort parameter.

9. The asymmetric multiprocessor system of claim 7 wherein the hysteretic adjustment includes decreasing a rate at which the first control effort parameter decreases.

10. The asymmetric multiprocessor system of claim 7 wherein the processor is selected from the group consisting of a central processing unit, a graphics processing unit, a general purpose graphics processing unit, a neural engine, an image signal processor, and a scaling and rotating engine.

11. The asymmetric multiprocessor system of claim 7 wherein the coprocessor is selected from the group consisting of a central processing unit, a graphics processing unit, a general purpose graphics processing unit, a neural engine, an image signal processor, and a scaling and rotating engine.

12. The asymmetric multiprocessor system of claim 7 wherein the first and second control effort parameters respectively affect at least one of an allocated subset of cores or execution units and a dynamic voltage and frequency state of the processor or the coprocessor.

* * * * *